US012664898B2

(12) United States Patent
Anderton et al.

(10) Patent No.: US 12,664,898 B2
(45) Date of Patent: Jun. 23, 2026

(54) METHODS AND SYSTEMS FOR DETERRING ANIMALS TO APPROACH OR ENTER IDENTIFIED ZONES

(71) Applicant: Protect Animals with Satellites, LLC, Upper Saddle River, NJ (US)

(72) Inventors: Terry Anderton, Hampton Falls, NH (US); Samuel Stoddard, Somersworth, NH (US)

(73) Assignee: Protect Animals with Satellites, LLC, Upper Saddle River, NJ (US)

( * ) Notice: Subject to any disclaimer, the term of this patent is extended or adjusted under 35 U.S.C. 154(b) by 94 days.

(21) Appl. No.: 18/650,781

(22) Filed: Apr. 30, 2024

(65) Prior Publication Data

US 2024/0379014 A1 Nov. 14, 2024

Related U.S. Application Data

(63) Continuation of application No. 17/522,288, filed on Nov. 9, 2021, now abandoned, which is a
(Continued)

(51) Int. Cl.
*G08G 5/30* (2025.01)
*G08G 5/55* (2025.01)
(Continued)

(52) U.S. Cl.
CPC ................. *G08G 5/30* (2025.01); *G08G 5/55* (2025.01); *G08G 5/57* (2025.01); *G08G 5/59* (2025.01);
(Continued)

(58) Field of Classification Search
CPC .. A01K 15/021; A01K 15/023; A01K 15/028; A01K 15/029; A01K 27/009;
(Continued)

(56) References Cited

U.S. PATENT DOCUMENTS 5,067,441 A 11/1991 Weinstein
5,576,994 A 11/1996 Kato et al.
(Continued)

FOREIGN PATENT DOCUMENTS

CA 3144145 A1 * 1/2021 ........... A01K 27/009
CA 2865966 C 7/2021
(Continued)

OTHER PUBLICATIONS

Alvaro Llaria; Geolocation and Monitoring Platform for Extensive Farming in Mountain Pastures ("Llaria"); IEEE International Conference on Industrial Technology (ICIT), pp. 2420-2425; Mar. 19, 2015.
(Continued)

*Primary Examiner* — Ebony E Evans
(74) *Attorney, Agent, or Firm* — Epstein Drangel LLP; Jodi-Ann McLane

(57) ABSTRACT

A system and method for deterring animals, such as pets, from entering, getting onto, or being in certain defined zones/locations created by a user. The pet monitoring system includes a smart collar configured to communicate with a plurality of powered transceivers/transmitters, particularly Bluetooth transmitters and transceivers. Each of the transceivers or transmitters has a unique ID associated with it. The smart collar, a smartphone or other wireless communicating device can read and record the signal strength of each of the transmitters at various locations and use that information to create prohibited zones that can be downloaded onto the smart collar. The smart collar can also contain a stimulus emitter for providing a warning to the animal and a communication device configured to alert the owner.

20 Claims, 20 Drawing Sheets

Related U.S. Application Data continuation-in-part of application No. 16/886,352, filed on May 28, 2020, now Pat. No. 11,166,435.

(60) Provisional application No. 62/853,308, filed on May 28, 2019.

(51) Int. Cl.

| | |
|---|---|
| *G08G 5/57* | (2025.01) |
| *G08G 5/59* | (2025.01) |
| *G08G 5/74* | (2025.01) |
| *H04W 4/40* | (2018.01) |
| *H04W 4/80* | (2018.01) |

(52) U.S. Cl.
CPC ............... *G08G 5/74* (2025.01); *H04W 4/40* (2018.02); *H04W 4/80* (2018.02)

(58) Field of Classification Search
CPC .. G08G 5/30; G08G 5/59; G08G 5/57; G08G 5/55; G08G 5/74; H04W 4/40; H04W 4/80; H04B 17/318
See application file for complete search history.

(56) References Cited

U.S. PATENT DOCUMENTS

| | | | |
|---|---|---|---|
| 5,857,433 A | 1/1999 | Files | |
| 5,868,100 A | 2/1999 | Marsh | |
| 5,949,350 A * | 9/1999 | Girard | A01K 15/023 |
| | | | 340/8.1 |
| 6,043,748 A | 3/2000 | Touchton et al. | |
| 6,166,643 A | 12/2000 | Janning et al. | |
| 6,232,880 B1 | 5/2001 | Anderson et al. | |
| 6,232,916 B1 | 5/2001 | Grillo et al. | |
| 6,271,757 B1 | 8/2001 | Touchton et al. | |
| 6,431,122 B1 * | 8/2002 | Westrick | A01K 15/023 |
| | | | 340/573.3 |
| 6,487,992 B1 | 12/2002 | Hollis | |
| 6,581,546 B1 | 6/2003 | Dalland et al. | |
| 6,683,564 B1 | 1/2004 | McBurney | |
| 6,700,492 B2 | 3/2004 | Touchton et al. | |
| 6,903,682 B1 | 6/2005 | Maddox | |
| 6,928,958 B2 | 8/2005 | Crist et al. | |
| 7,000,570 B2 | 2/2006 | Napolez et al. | |
| 7,017,524 B2 | 3/2006 | Gillis et al. | |
| 7,046,152 B1 | 5/2006 | Peinetti et al. | |
| 7,068,174 B1 | 6/2006 | Peinetti et al. | |
| 7,110,777 B2 | 9/2006 | Duncan | |
| 7,111,586 B2 | 9/2006 | Lee et al. | |
| 7,117,822 B1 | 10/2006 | Peinetti et al. | |
| 7,174,855 B2 | 2/2007 | Gerig et al. | |
| 7,198,009 B2 | 4/2007 | Crist et al. | |
| 7,204,204 B1 | 4/2007 | Peinetti et al. | |
| 7,222,589 B2 | 5/2007 | Lee, IV et al. | |
| 7,252,051 B2 | 8/2007 | Napolez et al. | |
| 7,259,718 B2 | 8/2007 | Patterson et al. | |
| 7,278,376 B1 | 10/2007 | Peinetti et al. | |
| 7,343,879 B2 | 3/2008 | Gerig et al. | |
| 7,345,588 B2 | 3/2008 | Gerig | |
| 7,360,505 B2 | 4/2008 | Gerig et al. | |
| 7,394,390 B2 | 7/2008 | Gerig | |
| 7,409,924 B2 | 8/2008 | Kates | |
| 7,495,570 B1 | 2/2009 | Peinetti et al. | |
| 7,552,699 B2 | 6/2009 | Moore | |
| 7,565,885 B2 | 7/2009 | Moore | |
| 7,602,302 B2 | 10/2009 | Hokuf et al. | |
| 7,667,642 B1 | 2/2010 | Frericks et al. | |
| 7,710,263 B2 | 5/2010 | Boyd | |
| 7,779,788 B2 | 8/2010 | Moore | |
| 7,826,862 B2 * | 11/2010 | Malik | G01S 5/02527 |
| | | | 455/69 |
| 7,861,676 B2 | 1/2011 | Kates | |
| 7,946,252 B2 | 5/2011 | Lee, IV et al. | |
| 8,011,327 B2 | 9/2011 | Mainini et al. | |

| | | | |
|---|---|---|---|
| 8,018,334 B1 | 9/2011 | DiMartino et al. | |
| 8,152,745 B2 | 4/2012 | Smith et al. | |
| 8,239,133 B2 | 8/2012 | Wang et al. | |
| 8,342,135 B2 | 1/2013 | Peinetti et al. | |
| 8,430,064 B2 | 4/2013 | Groh et al. | |
| 8,436,735 B2 | 5/2013 | Mainini | |
| 8,448,607 B2 | 5/2013 | Giunta | |
| 8,519,884 B2 * | 8/2013 | Wright | G01S 11/06 |
| | | | 342/125 |
| 8,704,728 B2 | 4/2014 | Mujahed et al. | |
| 8,736,499 B2 | 5/2014 | Goetzl et al. | |
| 8,779,925 B2 | 7/2014 | Rich et al. | |
| 8,803,692 B2 | 8/2014 | Goetzl et al. | |
| 8,823,513 B2 | 9/2014 | Jameson et al. | |
| 8,839,744 B1 | 9/2014 | Bianchi et al. | |
| 8,934,923 B1 | 1/2015 | Golden | |
| 8,935,093 B2 | 1/2015 | Chansarkar | |
| 8,939,111 B2 | 1/2015 | Berntsen | |
| 8,947,240 B2 | 2/2015 | Mainini | |
| 8,947,241 B2 | 2/2015 | Trenkle et al. | |
| 8,955,462 B1 | 2/2015 | Golden | |
| 8,972,180 B1 | 3/2015 | Zhao et al. | |
| 8,978,592 B2 | 3/2015 | Duncan et al. | |
| 9,146,113 B1 | 9/2015 | Funk et al. | |
| 9,173,380 B2 | 11/2015 | Trenkle et al. | |
| 9,258,982 B1 | 2/2016 | Golden | |
| 9,538,329 B1 | 1/2017 | Vivathana | |
| 9,648,849 B1 | 5/2017 | Vivathana | |
| 9,654,925 B1 | 5/2017 | Solinsky et al. | |
| 9,848,295 B1 | 12/2017 | Mason et al. | |
| 9,861,076 B2 | 1/2018 | Rochelle et al. | |
| 9,922,522 B2 | 3/2018 | Solinsky et al. | |
| 9,924,314 B2 | 3/2018 | Solinsky et al. | |
| 9,980,463 B2 | 5/2018 | Milner et al. | |
| 10,045,512 B2 | 8/2018 | Mainini et al. | |
| 10,151,843 B2 | 12/2018 | McFarland et al. | |
| 10,154,651 B2 | 12/2018 | Goetzl et al. | |
| 10,228,447 B2 | 3/2019 | Rich et al. | |
| 10,231,440 B2 | 3/2019 | Seltzer et al. | |
| D851,339 S | 6/2019 | Vivathana | |
| 10,356,585 B2 | 7/2019 | Ling et al. | |
| 10,444,374 B2 | 10/2019 | Park et al. | |
| 10,514,439 B2 * | 12/2019 | Seltzer | A01K 27/009 |
| 10,674,709 B2 | 6/2020 | Goetzl et al. | |
| 10,806,126 B1 | 10/2020 | Loewke et al. | |
| 10,842,129 B1 | 11/2020 | Anderton et al. | |
| 10,955,521 B2 | 3/2021 | Seltzer | |
| 10,986,813 B2 | 4/2021 | Seltzer et al. | |
| 11,013,214 B2 | 5/2021 | Anderton et al. | |
| 11,166,435 B2 | 11/2021 | Anderton et al. | |
| 11,372,077 B2 * | 6/2022 | Seltzer | A01K 11/008 |
| 11,470,814 B2 | 10/2022 | Goetzl et al. | |
| 11,553,692 B2 | 1/2023 | Goetzl et al. | |
| 12,292,527 B2 * | 5/2025 | Rich | G01S 5/14 |
| 2005/0009376 A1 | 1/2005 | Gotz et al. | |
| 2005/0066912 A1 | 3/2005 | Korbitz et al. | |
| 2006/0197672 A1 | 9/2006 | Talamas, Jr. et al. | |
| 2006/0247847 A1 | 11/2006 | Carter et al. | |
| 2007/0204804 A1 | 9/2007 | Swanson et al. | |
| 2008/0035072 A1 | 2/2008 | Lee | |
| 2008/0036610 A1 | 2/2008 | Hokuf et al. | |
| 2008/0272920 A1 | 11/2008 | Brown | |
| 2009/0011713 A1 * | 1/2009 | Abusubaih | G01S 11/02 |
| | | | 455/67.11 |
| 2009/0051547 A1 * | 2/2009 | McFarland | A01K 15/023 |
| | | | 340/573.3 |
| 2009/0174546 A1 * | 7/2009 | Lian | G01S 5/14 |
| | | | 340/8.1 |
| 2009/0309789 A1 | 12/2009 | Verechtchiagine | |
| 2010/0097208 A1 | 4/2010 | Rosing et al. | |
| 2010/0139576 A1 | 6/2010 | Kim et al. | |
| 2010/0161271 A1 | 6/2010 | Shah et al. | |
| 2011/0140884 A1 | 6/2011 | Santiago et al. | |
| 2011/0298615 A1 | 12/2011 | Rich et al. | |
| 2012/0206454 A1 | 8/2012 | Alasaarela | |
| 2012/0209730 A1 | 8/2012 | Garrett | |
| 2013/0044025 A1 | 2/2013 | Chiu | |
| 2013/0127658 A1 | 5/2013 | McFarland et al. | |
| 2013/0157628 A1 | 6/2013 | Kim et al. | |

(56)                    References Cited

U.S. PATENT DOCUMENTS

| | | | | |
|---|---|---|---|---|
| 2013/0179204 | A1 | 7/2013 | Sabarez, II | |
| 2013/0225282 | A1 | 8/2013 | Williams et al. | |
| 2013/0271281 | A1 | 10/2013 | Jessop | |
| 2013/0332064 | A1 | 12/2013 | Funk et al. | |
| 2014/0002239 | A1 | 1/2014 | Rayner | |
| 2014/0002307 | A1 | 1/2014 | Mole et al. | |
| 2014/0012094 | A1 | 1/2014 | Das et al. | |
| 2014/0025230 | A1 | 1/2014 | Levien et al. | |
| 2014/0048019 | A1 | 2/2014 | So | |
| 2014/0128115 | A1* | 5/2014 | Siomina | H04L 1/0026 |
| | | | | 455/501 |
| 2014/0261235 | A1 | 9/2014 | Rich et al. | |
| 2014/0319272 | A1 | 10/2014 | Casado Magaña et al. | |
| 2014/0320347 | A1 | 10/2014 | Rochelle et al. | |
| 2014/0335887 | A1 | 11/2014 | Liu et al. | |
| 2014/0352632 | A1 | 12/2014 | McLaughlin | |
| 2015/0065167 | A1 | 3/2015 | Scalisi | |
| 2015/0107531 | A1 | 4/2015 | Golden | |
| 2015/0181840 | A1 | 7/2015 | Tupin, Jr. et al. | |
| 2015/0219767 | A1 | 8/2015 | Humphreys et al. | |
| 2015/0269624 | A1 | 9/2015 | Cheng et al. | |
| 2015/0373951 | A1* | 12/2015 | Kelly | A01K 29/005 |
| | | | | 340/573.3 |
| 2016/0007888 | A1 | 1/2016 | Nieminen et al. | |
| 2016/0097861 | A1 | 4/2016 | Li et al. | |
| 2016/0150362 | A1 | 5/2016 | Shaprio et al. | |
| 2016/0178392 | A1 | 6/2016 | Goldfain | |
| 2016/0210863 | A1 | 7/2016 | Kohn-Rich | |
| 2016/0225264 | A1 | 8/2016 | Taveira | |
| 2016/0259061 | A1 | 9/2016 | Carter | |
| 2016/0278346 | A1 | 9/2016 | Golden | |
| 2017/0066464 | A1 | 3/2017 | Carter et al. | |
| 2017/0265432 | A1* | 9/2017 | Anderton | A01K 15/029 |
| 2017/0372580 | A1 | 12/2017 | Vivathana | |
| 2019/0029221 | A1 | 1/2019 | Anderton et al. | |
| 2020/0267941 | A1 | 8/2020 | Seltzer et al. | |
| 2021/0012667 | A1 | 1/2021 | Sabato | |
| 2021/0124376 | A1 | 4/2021 | Edara et al. | |
| 2021/0185984 | A1* | 6/2021 | Kania | A01K 15/023 |
| 2022/0068142 | A1 | 3/2022 | Anderton | |
| 2022/0236367 | A1* | 7/2022 | Seltzer | A01K 27/009 |
| 2022/0256812 | A1 | 8/2022 | Huber et al. | |
| 2022/0257132 | A1 | 8/2022 | Huber et al. | |
| 2022/0287577 | A1 | 9/2022 | Huber et al. | |
| 2022/0304276 | A1* | 9/2022 | Franco | G08B 21/18 |
| 2023/0039951 | A1 | 2/2023 | Seltzer et al. | |
| 2023/0240269 | A1 | 8/2023 | Mainini et al. | |
| 2023/0301532 | A1 | 9/2023 | Huber et al. | |
| 2024/0010217 | A1* | 1/2024 | Gage | B60K 35/80 |

FOREIGN PATENT DOCUMENTS

| | | | | |
|---|---|---|---|---|
| CN | 101713822 | B | 8/2013 | |
| CN | 105393139 | B | 7/2019 | |
| FR | 2869691 | A1 | 11/2005 | |
| GB | 2220814 | A  * | 1/1990 | A01K 11/006 |
| JP | 10260055 | A | 9/1998 | |
| JP | 10295212 | A | 11/1998 | |
| JP | 4787762 | B2 | 10/2011 | |
| JP | 2015139667 | A | 8/2015 | |
| KR | 102265654 | B1 | 6/2021 | |
| WO | 1997024074 | A3 | 10/1997 | |
| WO | 2000057692 | A1 | 10/2000 | |
| WO | 2014151064 | A1 | 9/2014 | |
| WO | 2014182420 | A2 | 11/2014 | |
| WO | 2015173712 | A1 | 11/2015 | |
| WO | 2016067116 | A1 | 5/2016 | |

OTHER PUBLICATIONS

D. M. Anderson; Virtual Fencing—Past, Present and Future ("Anderson II"); The Rangeland Journal vol. 26, pp. 65-78.

Johnathan Chang, et. al.; Wireless Pet Containment ("Chang"); Rutgers University, Electrical and Computer Engineering Department, Capstone Design Projects, Team Project No. SP16-002; Feb. 22, 2016.

W. Randolph Franklin, PNPoly—Point Inclusion in Polygon Test W. Randolph Franklin (WRF), May 18, 2005, https://web.archive.org/web/20050518083531/http://www.ecse.rpi.edu/Homepages/wrf/Research/Short_Notes/pnpoly.html ("Franklin").

Kai Hormann, et. al.; The Point in Polygon Problem for Arbitrary Polygons ("Hormann"); Computational Geometry, vol. 20 Issue 3; Nov. 2001.

Alejandro Weinstein; Distance from a Point to a Polygon ("Weinstein"); Matlab Central File Exchange; Apr. 1, 2008.

Donald H. House, Chapter 9—Raycasting Polygonal Models, Dec. 28, 2013, https://web.archive.org/web/20131228085233/http://people.cs.clemson.edu/~dhouse/courses/405/notes/raypolygon.pdf ("House").

Andrea Antonia Serra, et. al.; A Low-Profile Linearly Polarized 3D PIFA for Handheld GPS Terminals ("Serra"); IEEE Transactions on Antennas and Propagation, vol. 58, No. 4, pp. 1060-1066; Jan. 26, 2010.

Paul D Groves, et. al.; Context Detection, Categorization and Connectivity for Advanced Adaptive Integrated Navigation ("Groves"); Institute of Navigation GNSS+ 2013, Sep. 16-20, 2013, Nashville, TN, USA; Sep. 20, 2013.

Jeffrey David Miller; A Maximum Effort Control System for the Tracking and Control of a Guided Canine; A dissertation submitted to the Graduate Faculty of Auburn University in partial fulfillment of the requirements for the Degree of Doctor of Philosophy; Dec. 13, 2010; 216 pages.

Arun Vydhyanathan, et. al.; The Next Generation Xsens Motion Trackers for Industrial Applications ("Xsens"); 2015 Whitepaper published by Xsens regarding Motion Trackers (Version 2.0.1); 2015.

SiRF Technology Inc.; SiRF Demo UserGuide ("SiRF"); Mar. 2016.

Stefan Schirra; How Reliable are Practical Point-in-Polygon Strategies? ("Schirra"); 16th European Symposium on Elgorithms (ESA); 2008.

Collision Course II: Ray-Polygon-Intersection ("Claus"); Phys.ik.cx; Apr. 28, 2016.

LMU User's Guide ("LMU"); CalAmp DataCom Inc.; Dec. 2009.

Salvatore John Giunta; Garmin DC50 Dog Collar ("Garmin DC50"); 2013.

The Whistle GPS Pet Tracker & Activity Monitor ("Whistle"); Whistle Labs Inc.; 2015.

Tractive GPS Pet Tracker ("Tractive"); Tractive GmbH; 2013.

Tagg—The Pet Tracker ("Tagg"); Snaptracs Inc./Qualcomm Incorporated; 2011.

NoFence; Nofence AS; 2016.

Directional Virtual Fencing (DVF) Devices ("DVF"); United States Department of Agriculture Research / Massachusetts Institute of Technology; 2007.

Invisible Fence Brand GPS 2.0 ("Invisible Fence"); Invisible Fence, Inc.; 2015.

PeTrak Electric Fence ("PeTrak"); PeTrak, LLC; 2012.

Wolf-Tek Pet Collar ("Wof-Tek"); Wolf-Tek, LLC; 2015.

Mastrack Tracking System ("MasTrack"); MasTrack, LLC; 2015.

GPS Trackit ("GPS Trackit"); GPS Trackit, LLC; 2013.

Life 360 Family Safe Assist and Driver Protect ("Life360"); Life360 Inc.; May 25, 2016.

Geozilla Family Locator ("GeoZilla"); GeoZilla, Inc.; Apr. 2, 2016.

Fleetsat GPS Tracking Solutions ("Fleetsat"); Fleetsat Inc.; Jan. 3, 2015.

Trimble Aardvark DR + GPS ("Aardvark"); Trimble Navigation Limited; Jun. 29, 2012.

Round Solutions Nano Tracker Tracking Device ("NanoTracker"); Round Solutions GMBH & CO KG; Apr. 18, 2016.

Zack Butler, Peter Corke, Ron Peterson, Daniela Rus; Virtual Fences for Controlling Cows; Dartmouth College Department of Computer Science; CSIRO Manufacturing & Infrastructure Technology Brisbane; MIT Computer Science and Artificial Intelligence Laboratory; New Orleans, LA; Apr. 2004; 9 pages.

(56) References Cited

OTHER PUBLICATIONS

Yilmaz Kemal Yüce, et al.; An alternative approach to overcome ethical issues of geotracking patients with Alzheimer's disease; 7th International Symposium on Health Informatics and Bioinformatics; 2012.

Bogdan Târnaucă, et al.; Using Complex Event Processing for implementing a geofencing service; IEEE 11th International Symposium on Intelligent Systems and Informatics (SISY); Nov. 14, 2013.

Arun Vydhyanathan et al.; The Next Generation Xsens Motion Trackers for Industrial Applications; Xsens; 2015; 9 pages.

Berbakov et al.; Smart-Phone Application for Autonomous Indoor Positioning; Proceedings of the IEEE International Instrumentation and Measurement Technology Conference; May 14, 2015; pp. 670-374.

How to check if a given point lies inside or outside a polygon?— Geeks for Geeks, Jul. 11, 2013, https://web.archive.org/web/20130715200034/http://www.geeksforgeeks.org/how-to-check-if-a-given-point-lies-inside-a-polygon ("Geeks").

Vivek Shah, When is a Point Inside a Polygon?, May 17, 2013, https://web.archive.org/web/20130517010213/http://cgatglance.blogspot.com/ ("Shah").

Collision Course II: Ray-Polygon-Intersection, Apr. 28, 2016, https://web.archive.org/web/20161021075420/http://phys.ik.cx/ ("Claus").

A. Bahga and V. Madisetti, "Cloud-Based Information Technology Framework for Data Driven Intelligent Transportation Systems," Journal of Transportation Technologies, vol. 3 No. 2, 2013, pp. 131-141. doi: 10.4236/jtts.2013.32013.

Prasad, S., Weeks, M., Zhang, Y., Zelikovsky, A., Belkasim, S., Sunderraman, R., & Madisetti, V. (2002). Mobile Fleet Application using Soap and System on Devices (SYD) Middleware Technologies. Communications, Internet, and Information Technology.

Madisetti, Vijay, et al. (2004). SyD: A Middleware Testbed for Collaborative Applications over Small Heterogeneous Devices and Data Stores. 3231. 352-371. 10.1007/978-3-540-30229-2_19.

* cited by examiner

INTENSITY

|   | 20A | 20B |
|---|-----|-----|
| A | 9 | 2 |
| B | 7 | 5 |
| C | 3 | 10 |
| D | 2 | 10 |
| E | 3 | 9 |
| F | 5 | 7 |
| G | 9 | 3 |
| H | 10 | 1 |

FIG. 8B

INTENSITY

| | 20A | 20B | 20C |
|---|---|---|---|
| AA | 7 | 2 | 1 |
| BB | 7 | 5 | 3 |
| CC | 3 | 10 | 5 |
| DD | 1 | 10 | 5 |
| EE | 2 | 8 | 10 |
| FF | 5 | 8 | 10 |
| GG | 9 | 4 | 6 |
| HH | 10 | 1 | 2 |

Network/Database with Pre-Flight Information

1170

1120

1120

1160

1110

1120

METHODS AND SYSTEMS FOR DETERRING ANIMALS TO APPROACH OR ENTER IDENTIFIED ZONES

CROSS-REFERENCE TO RELATED APPLICATIONS

This application is a continuation of U.S. Non-Provisional application Ser. No. 17/522,288, filed on Nov. 9, 2021, which is a continuation in part of Non-Provisional application Ser. No. 16/886,352, filed on May 28, 2020, which claims priority to U.S. Provisional Application No. 62/853, 308, filed on May 28, 2019, the contents of which are incorporated herein in their entirety.

FIELD OF THE INVENTION

The present invention relates generally to preventing animals, such as pets, from entering, getting onto, or being in certain defined zones created by a user.

BACKGROUND OF THE INVENTION

Several mechanisms and systems exist to prevent animals from entering or leaving a particular area. Many of these include utilizing a pet collar that has a stimulus mechanism, which is triggered when the animal wearing the collar enters into a restricted area. Some systems included using RFID tags that can be placed on certain items, which when registered by the collar, can provide the aforementioned stimulus as a means for training or deterring the pet wearing the collar from being near a restricted area or on a restricted piece of furniture.

One of the downsides of using RFID is that the animal (or technically the collar) has to get really close to the RFID chip for it to register. Another downside, is that to increase the effective reach of the RFID chip and reader (on the collar) a lot of power has to be utilized for the signal to travel more than a couple of inches. Smart Pet Collars, like most smart devices, operate off of rechargeable batteries and thus have a limited resource of power before being required to be recharged. This high-power consumption event, renders this kind of solution to be unworkable, or one that comes with the sacrifice having a larger battery, giving up other power consumption features or forcing the user to charge the collar frequently. Again, these are really untenable solutions.

An example of a smart collar can be found in U.S. Patent Application Publication No. 2017-0265432, the entirety of which is incorporated by reference herein.

The present application seeks to overcome these and other deficiencies in order to improve upon creating restricted zones using low power consumption techniques that are effective and accurate.

SUMMARY

It is desirable to have a system and a method for preventing animals, such as pets, from entering, getting onto, or being in certain defined zones created by a user. Accordingly, the present application relates to systems and methods for defining zones such as animal restricted zones.

In some embodiments, an animal restricted zone system includes an animal-borne smart collar and a plurality of powered transceivers. Each of the plurality of powered transceivers has a unique identification location, a location, and are configured to emit a signal. The smart collar includes a non-transitory computer-readable medium containing a set of computer-implemented instructions, a first set of processing circuitry operatively connected to the non-transitory computer-readable medium, the processing circuitry being configured to implement the first set of computer instructions, a wireless transceiver, a stimulus emitter, and a power source. The collar is configured to receive multiple emitted signals simultaneously and determine the signal strength of each signal. The processing circuitry is configured to determine a distance relative to a pre-determined warning or prohibited zone based on the signal strength of each signal associated with the plurality of powered transceivers. The plurality of powered transceivers may include a Bluetooth transceiver or a WIFI transceiver.

In some embodiments, a method of establishing an animal restricted zone includes placing a first emitter at a first location at or a near a portion of an animal restricted zone. A second emitter is placed at a second location at or a near a portion of the animal restricted zone, and the first location is different than the second location. A wireless communication device is utilized to establish a perimeter around the animal restricted zone, and the established perimeter is uploaded to a smart collar.

In at least one embodiment, the method includes placing a third emitter at a third location at or a near a portion of the animal restricted zone and the third location is different than the first location and the second location.

In at least one embodiment, the method includes creating an identified zone name for the animal restricted zone and inputting a unique identification associated with each of the first emitter and the second emitter.

In at least one embodiment, the method includes creating a table with the signal strength of each emitter along various points along a perimeter of the animal restricted zone.

In at least one embodiment, the perimeter is established by moving the wireless transceiver about a desired perimeter of the desired animal restricted zone and recording signal strength of each emitter at various points along the desired perimeter.

In some embodiments, an animal restricted zone system includes an animal-borne smart collar and at least two Bluetooth emitters. Each of the Bluetooth emitters has a unique identification location, a location, and are configured to emit a signal. The smart collar includes a non-transitory computer-readable medium containing a set of computer-implemented instructions, a first set of processing circuitry operatively connected to the non-transitory computer-readable medium, the processing circuitry being configured to implement the first set of computer instructions, a wireless transceiver, a stimulus emitter, and a power source. The collar is configured to receive multiple emitted signals simultaneously and determine the signal strength of each signal. The processing circuitry is configured to determine a distance relative to a pre-determined warning or prohibited zone based on the signal strength of each signal associated with the plurality of powered transceivers. The plurality of powered transceivers may include a Bluetooth transceiver or a WIFI transceiver.

It is desirable to have a drone guidance system and a method for assisting drones navigating more difficult areas, particularly those with taller structures or GPS impeding structures.

In some embodiments, A drone guidance system comprises at least three programmable Bluetooth transmitters positioned about an exterior or exterior facing portion of a building, monument, or structure, wherein each programmable Bluetooth emitter is configured to emit a structure type indicator and position relationship indicator; a Bluetooth receiver disposed about a drone and configured to receive emitted information from the at least programmable Bluetooth transmitters; and a processing unit disposed on the drone and configured to determine at least one of a prohibited zone about the building, monument, or structure or a pathway information based on received emitted information from the Bluetooth receiver, which includes structure type indicator, position relationship indicator and also signal strength of each received emission from the transmitters.

The at least three programmable Bluetooth transmitters can also be configured to emit street indicator information as well as emit GPS coordinate indicator information.

The processing unit of the drone can be configured to compare the street indicator information to a flight plan to determine where the drone is relative to the flight plan.

The at least three programmable Bluetooth transmitters can also be configured to receive drone identification information emitted from the drone. This drone identification information can be transmitted by the at least one of the at least three programmable Bluetooth transmitters via a network to a pre-flight database which can also include indicator information associated with the Bluetooth transmitter.

In some variations, status information associated with the drone can be received, the status information including at least battery power information.

The at least three programmable Bluetooth transmitters can be connected to a network that communicates with a pre-flight database containing pre-flight data for the drone.

The pre-flight path of the drone can be recorded in the pre-flight database, which can be later used to determine current or intended pathway information associated with the drone based on received Bluetooth transmitter information.

The at least three programmable Bluetooth transmitters can be configured to provide perimeter boundary information to an intended pre-flight path of the drone.

The pre-flight path includes structure type indicator information along the pathway of the pre-flight path.

In yet another embodiment, a method of guiding a drone comprising the steps of: recording in a database pre-flight path information, which includes the intended flight-path of the drone; programming at least three Bluetooth transmitters disposed about a structure to emit structure indicator and position indicator information; determining by a processing unit disposed on the drone one of: proximity to a prohibited zone and proximity to the intended-flight path based on received emissions from a plurality of the at least three Bluetooth transmitters.

The method of guiding a drone can further comprise the step of receiving by one of the at least three Bluetooth transmitters drone identification information emitted from the drone.

The method of guiding a drone can further comprise the step of transmitting via a network to a pre-flight database the received drone identification information and at least one structure or position indicator associated with the Bluetooth transmitter receiving the drone identification information.

The method of guiding a drone can further comprise the step of sending to a user current drone information based on the transmitted information.

The method guiding a drone can further comprise the step of determining by a processing unit associated with the pre-flight database whether updated flight-path information should be sent to the drone based on the transmitted information.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A-B illustrate mapping points along a prohibited zone in a table showing the intensity or signal strength of individual emitters;

FIGS. 9A-B illustrate mapping points along a prohibited zone in a table showing the intensity or signal strength of individual emitters;

DETAILED DESCRIPTION OF THE INVENTION

Figure 1:
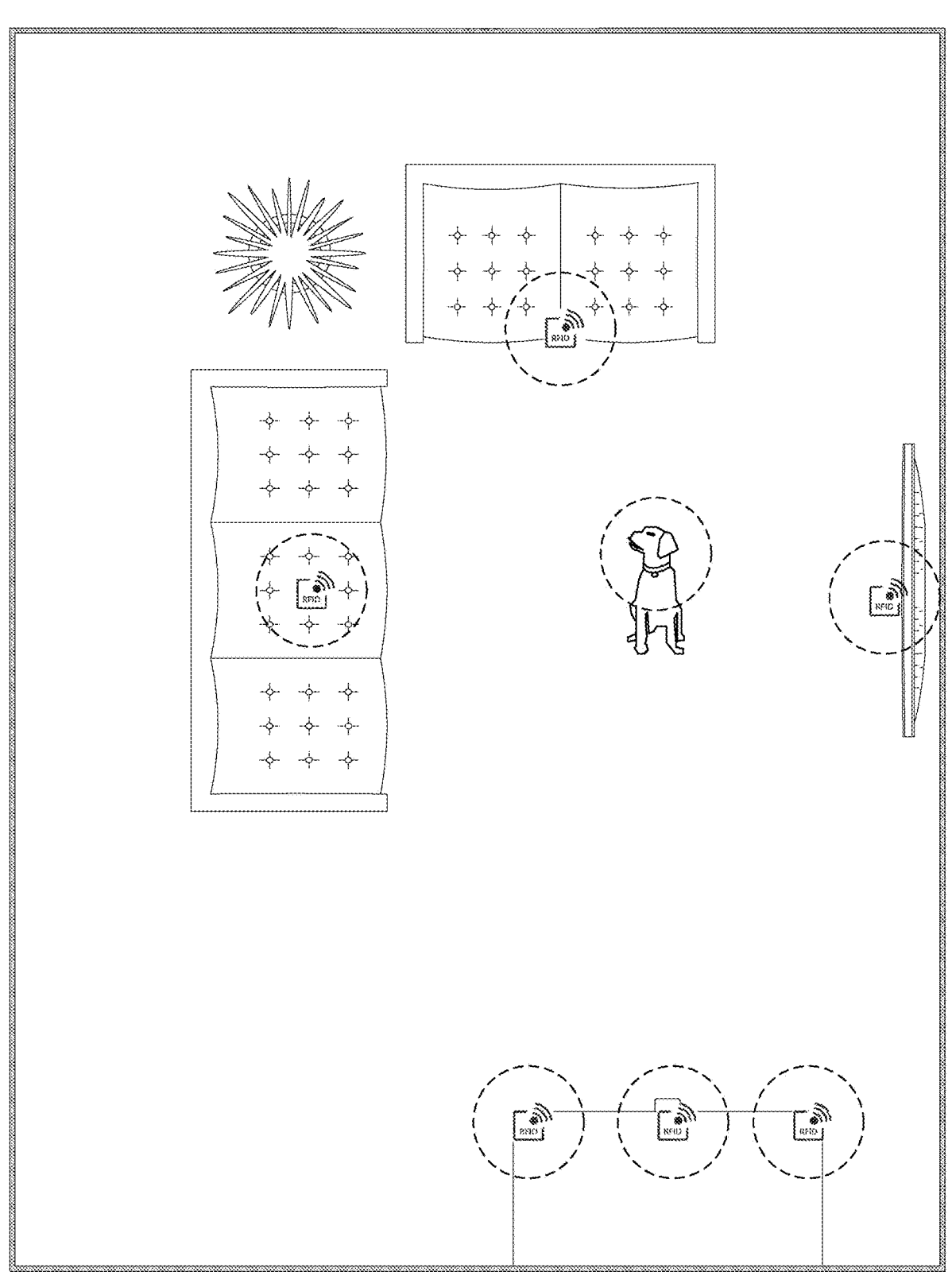
FIG. 1 illustrates prior art solutions for zone prevention.

As noted above, the prior art uses RFID chips and readers to determine forbidden zones for animals—see U.S. Pat. No. 8,917,172. FIG. 1 is an illustration meant to convey the shortcomings of a system such as that in patent '172. For example, read range for typical low power RFID tags is several inches and up to a foot. Extended ranges can be achieved, but not without battery assisted RFID tags and a high-power reader, which consumes more energy. One of the potential solutions for solving the drain on the limited battery power in a collar was to use a motion harvesting system. This works if the animal is active, but even motion harvesting systems require significant amounts of motion to create even small amounts of energy. As shown in FIG. 1, the ranges associated with reading RFID tags are very limited and, in any case, may not completely cover the desired zone.

Figure 2:
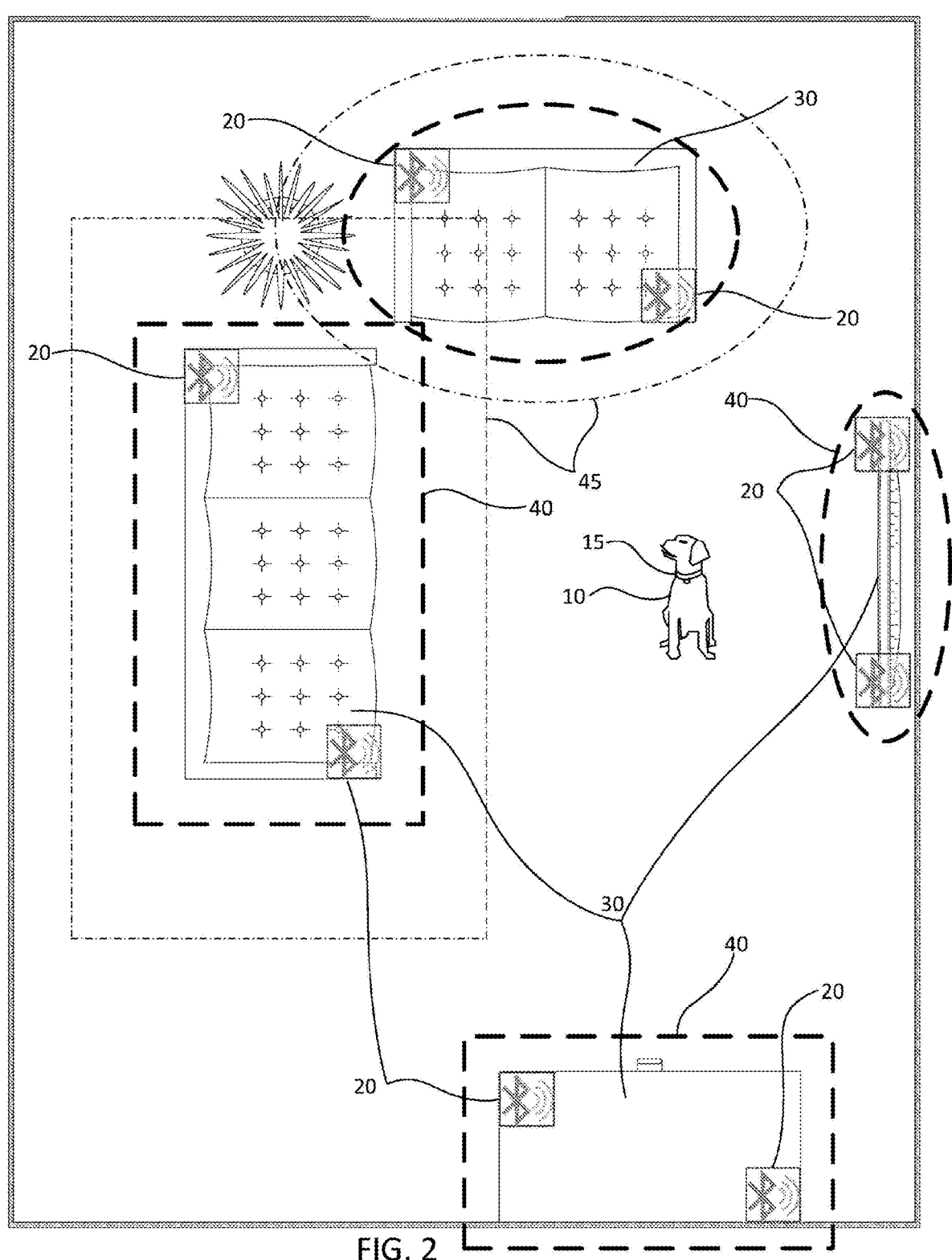
FIG. 2 illustrates an exemplary schematic of a location-based pet training system illustrative of various inventive concepts thereof.

FIGS. 2-5 illustrate exemplary embodiments utilizing an improved system for keeping and training to keep animals away from prohibited zones. As illustrated in FIG. 2, multiple Bluetooth transmitters 20 can be attached to various portions of furniture 30 or areas where a desired prohibited zone 40 (and/or warning zone 45) is to be created. In this configuration and other configurations, the Bluetooth tiles are shown being placed inside the prohibited zone; however, it is to be understood that the Bluetooth transmitters can be placed outside of the prohibited zone and still function correctly, which will become clearer below.

The zones that are created can take on multiple geographic shapes. For example, rectangular zones are created around a number of pieces of furniture, while an oval or circular shaped zone is created around another piece of furniture. As will become apparent below, the increased number of emitters helps with the accuracy and defining of the zone shape. As the animal wearing the smart collar enters the warning zone, certain indicators including lights, sounds, vibrations and other mechanisms associated with the smart collar or communicating with the smart collar can be utilized. A notice to the animal's owner can also be received. Additional lights, sounds, vibrations and other stimuli used for training animals can be triggered if the animal enters into the prohibited zone and persist until the animal leaves the prohibited zone 40, after which the stimuli can stop. These stimuli are well-known in the art for training animals.

Figure 3:
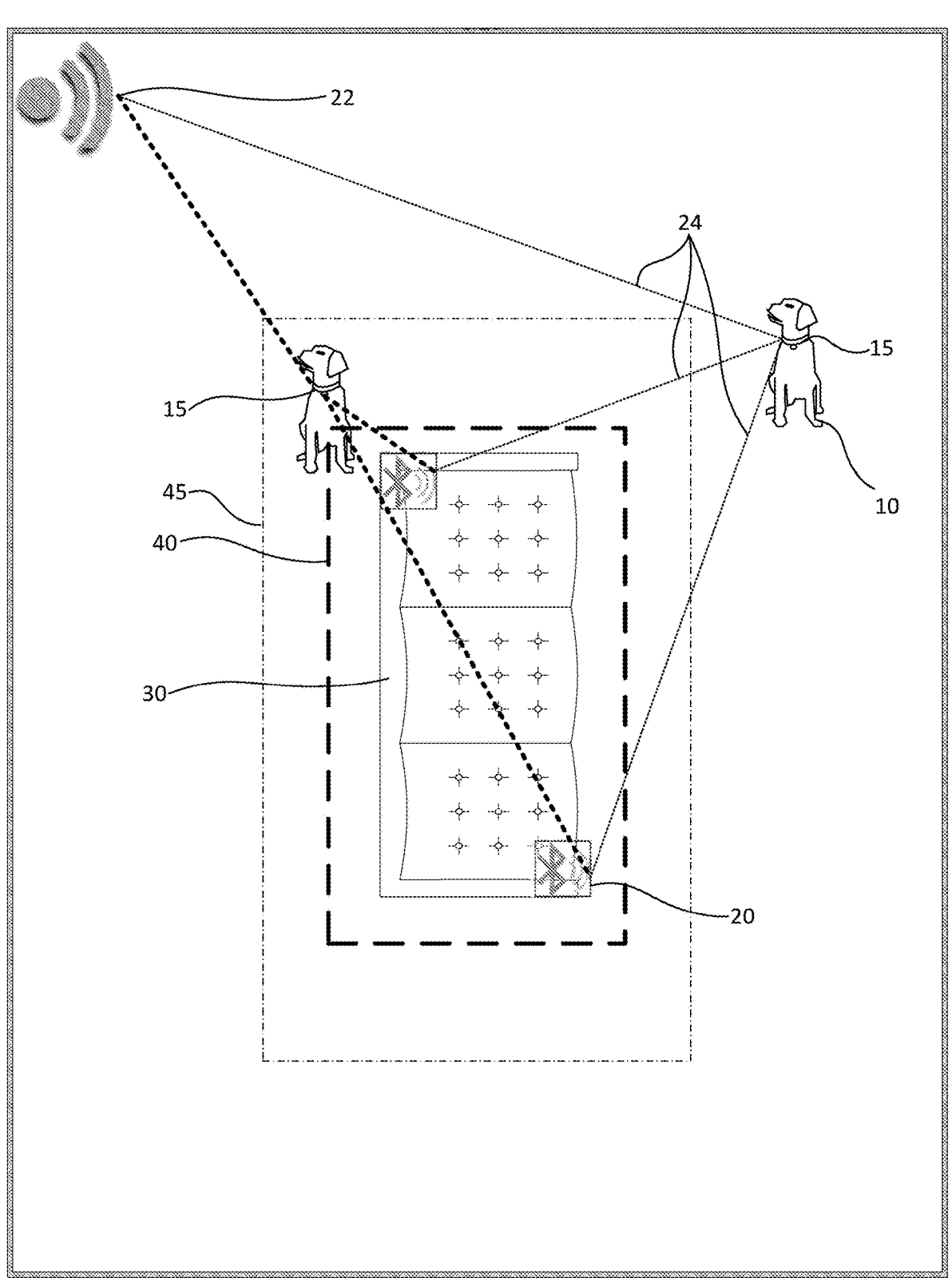
FIG. 3 illustrates an embodiment of utilizing Bluetooth and WIFI signals to help determine warning and prohibited zones to the smart collar.

FIG. 3 illustrates a couple examples where a combination of WIFI and Bluetooth transmitter signals 24 are received by the collar to determine whether or not the animal has entered into one of the zones. As shown, by having 3 signals, even varying types of signals, the processor and memory on the collar utilizing formulaic software instructions can calculate whether or not the animal has entered into one of the zones and trigger as mentioned above appropriate reminders, notifications and/or stimuli. Often in houses or other indoor places equipment, such as WIFI routers 22 or repeaters, emitting WIFI signals are limited in the number per room or as often the case one router can cover multiple rooms, as WIFI signals can emit over a longer range. One advantage of utilizing multiple signals to determine prohibited zones is that a single signal often has to be centered within the prohibited zone, and thus it can be difficult to truly design an ideal prohibited zone. At the very least a zone that has a non-circular shape is difficult if not impossible to make with a single emitter.

Figure 4:
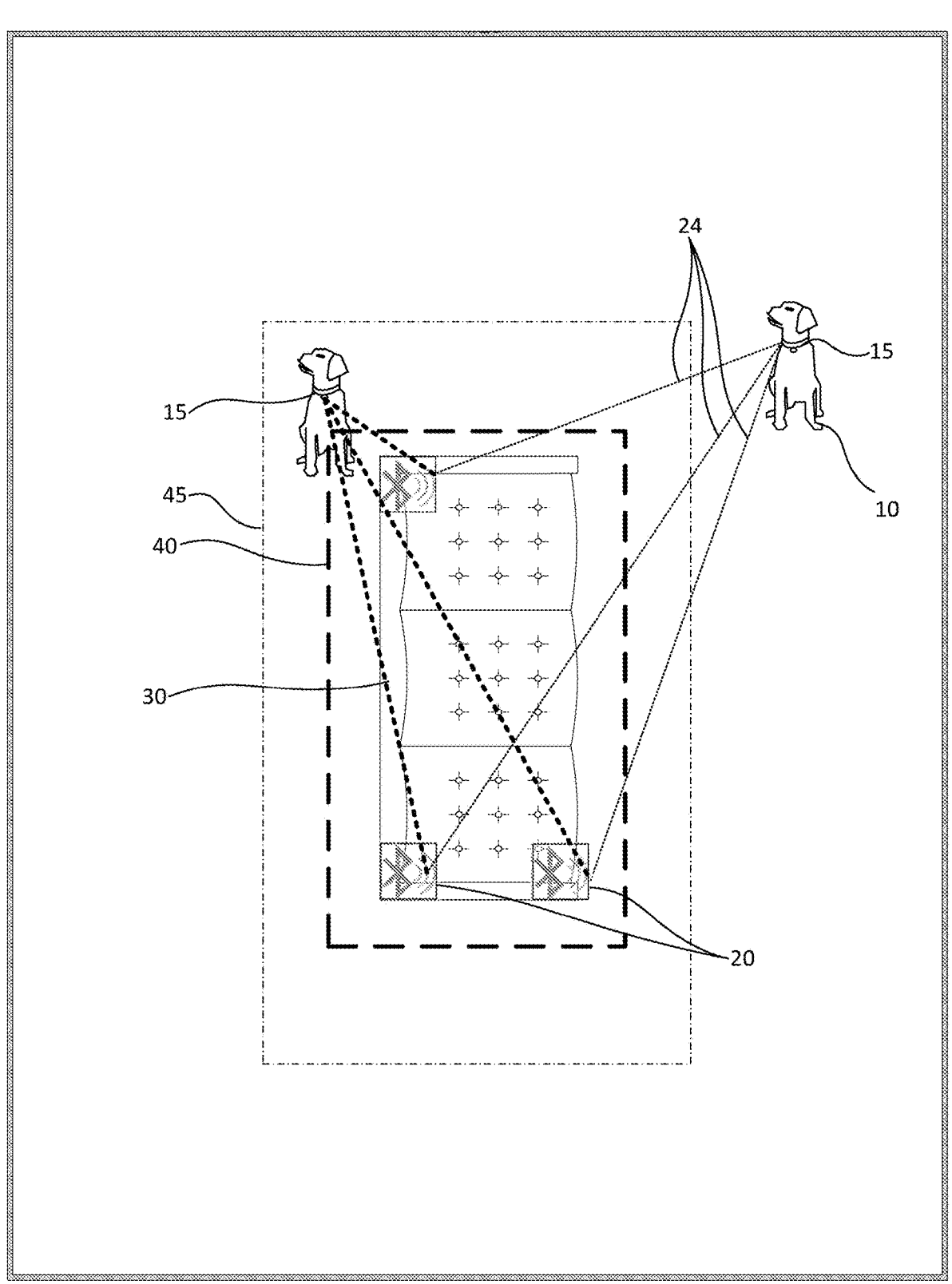
FIG. 4 illustrates an embodiment of utilizing 3 Bluetooth transmitters to help determine warning and prohibited zones to the smart collar.

FIG. 4 illustrates an arrangement that utilizes 3 Bluetooth transmitters to help form the prohibited 40 and warning zones 45 as they provide the necessary information to the smart collar 15 worn by the animal 10 animal respect to each of the zones.

Figure 5:
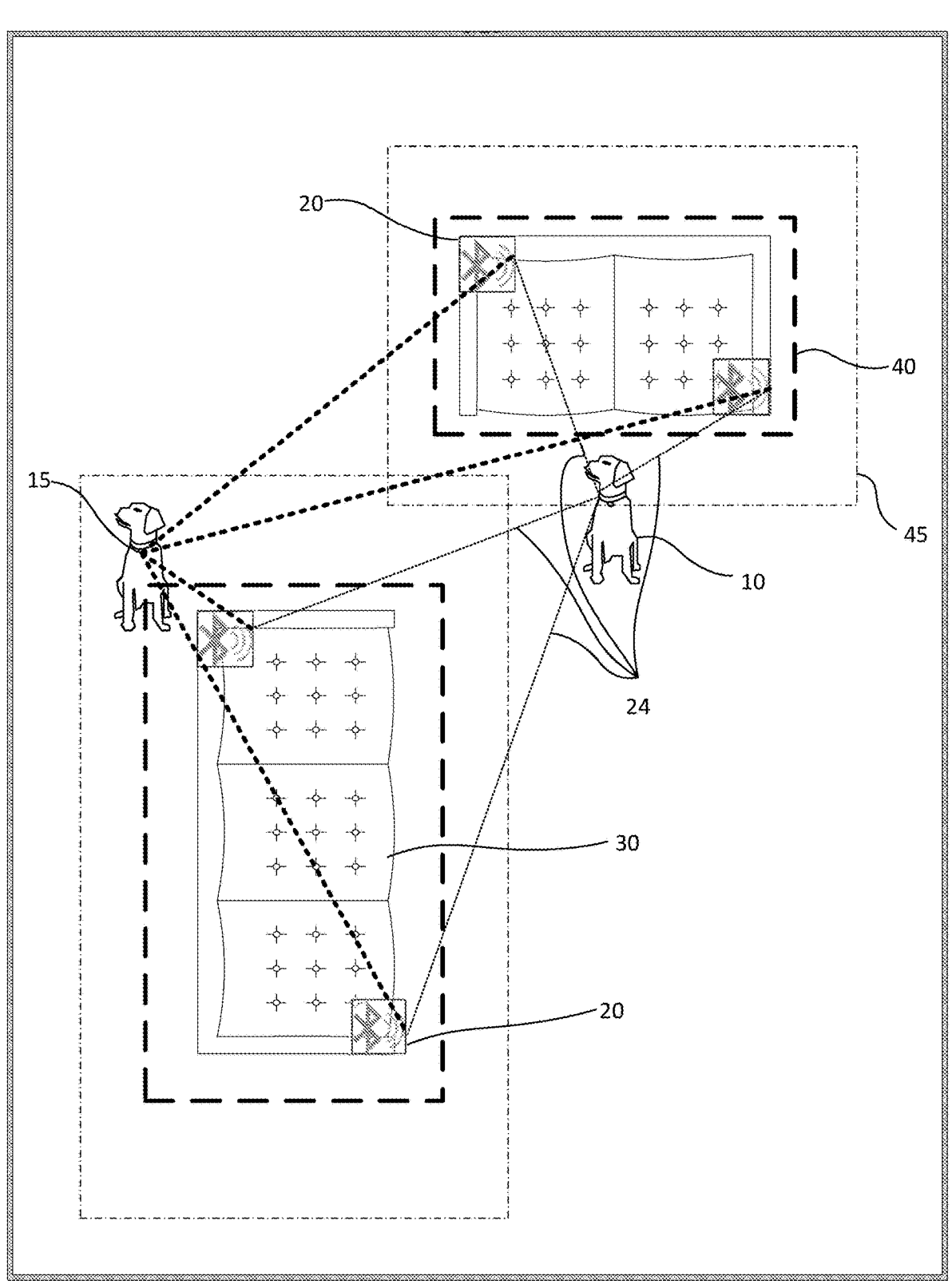
FIG. 5 illustrates an embodiment of utilizing 3 or more Bluetooth transmitters attached to multiple items to help determine warning and prohibited zones to the smart collar.

FIG. 5 illustrates another arrangement where some of the Bluetooth transmitters 20 are within the defined prohibited or warning zone, while other Bluetooth transmitters 20 are within a nearby prohibited zone, but their signal is strong enough that they can help form and provide data to the smart collar 15. In other words, the systems and methods described herein can utilize, as noted above, multiple transmitters to help determine and create various zones both from within the zone and outside of the zone. In the arrangement shown, the animal 10 can see up to 4 Bluetooth transmitters at a given time.

Figure 6A:
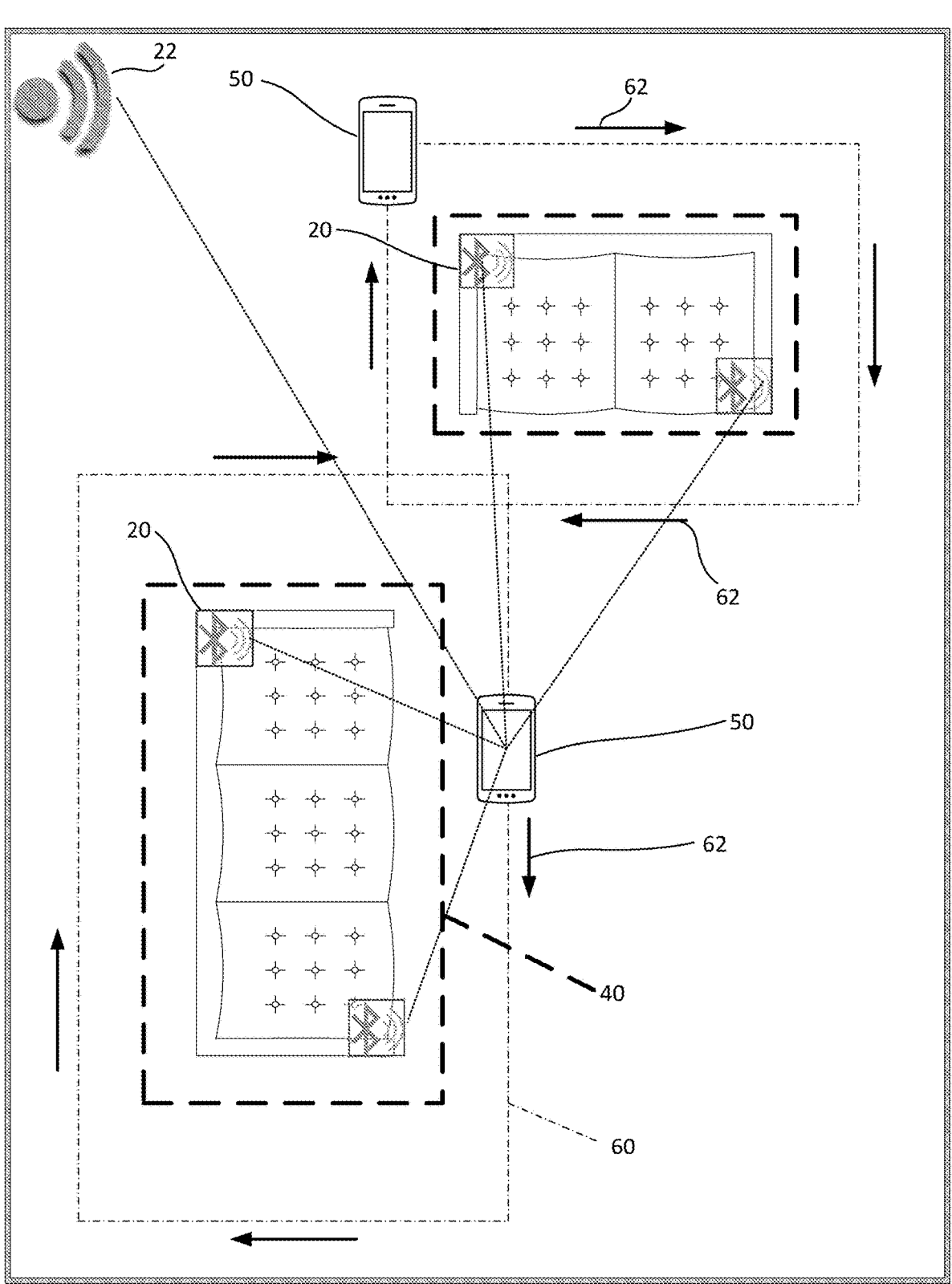
FIGS. 6A-B illustrates utilizing a smartphone or smart collar device to set up warning and prohibited zones for use with the smart collar.
Figure 6B:
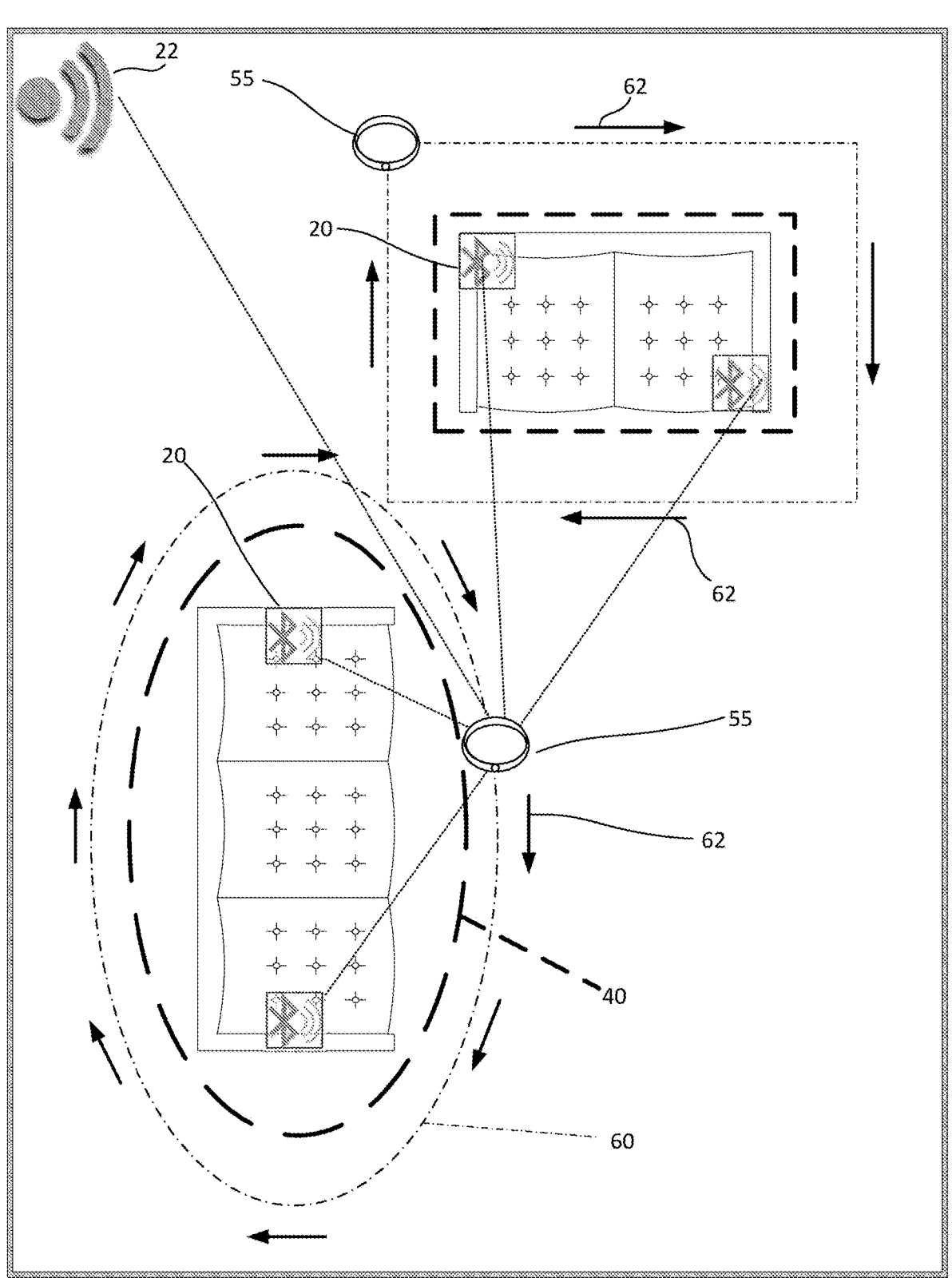

FIGS. 6A-B are illustrations showing how a user can initiate a set up program on a smartphone device 50 or smart collar 55 to create various zones. Once a user positions each Bluetooth transmitter 20 about each piece of furniture 30, the user can then create and name each particular zone, which can be designated a type including prohibited, warning, or open zone. As the user walks or travels 62 around the furniture 30 with their device (50, 55) to form an invisible zone 60, the strength of the signals from each transmitter (both Bluetooth 20 and WIFI signals 22 that are available)

are recorded, as well as the unique identification of each Bluetooth transmitter (and WIFI emitter) is noted, so that they can be associated with a particular zone and input into a table (discussed below). The user can also designate whether each of the transmitters are disposed within or outside of the formed zone(s). The invisible zone 60 can either become the prohibited 40 or alternatively, the user can shrink or enlarge the zone. As shown in FIGS. 6A-B the invisible zone 60 that is created by traveling 62 around the furniture is larger than the finalized prohibited zone 40.

As the smartphone 50 or smart collar 55 reads each transmitter, a unique identifier is associated with each transmitter, the strength of the signal as the setup device changes positions is recorded and associated with each unique identifier. In some instances, the Bluetooth transmitters can be two-way transceivers, to both receive and transmit information. This two-way transceiver can allow the positioning to be configured using angles in addition to signal strength alone. Triangulation often uses at least three points, angles, direction and speed to determine the position of an object, while trilateration uses signal strength of at least three signals to determine where an object is. Although the present arrangements shown herein can track the collar, one of the main objects is to create invisible zones and determine whether the collar has entered the zone, or whether the collar is entering a warning zone associated with the prohibited zone, so that a stimulating device or notification associated with the collar can be triggered. It is not necessary to determine an exact location of the collar for the system to function properly.

In addition to being able to map out a 2-D region, the system can be configured for a 3-dimensional space. For example, in some instances the animals could be allowed to go around, below and underneath a kitchen table, but the moment a plane or space near or above say a table is breached the stimuli, training and other warning mechanisms are initiated. In other instances, a user may be okay with the animal on the bed, but not want the animal burrowing under the bed. For setting up a 3-dimensional zone, similar walking around the zone can be done, but an additional height component registry can be recorded.

An alternative way of setting up warning and prohibited zones includes placing a smartphone 50 and/or the smart collar 55 at specific points around the perimeter that defines each of the zones. At each point the smartphone and/or collar reads each of the emitted Bluetooth or WIFI signals and stores those signals in memory for each spot along the perimeter. Once each of the spots have been completed, the information stored in memory is then analyzed either locally on the smartphone or smart collar or transmitted to the cloud to be analyzed, where a zone is then created. That zone information is then stored locally on the collar and includes a set of rules of when to trigger stimuli, send notifications or trigger other features associated with the collar or devices communicating with the collar.

Figure 7A:
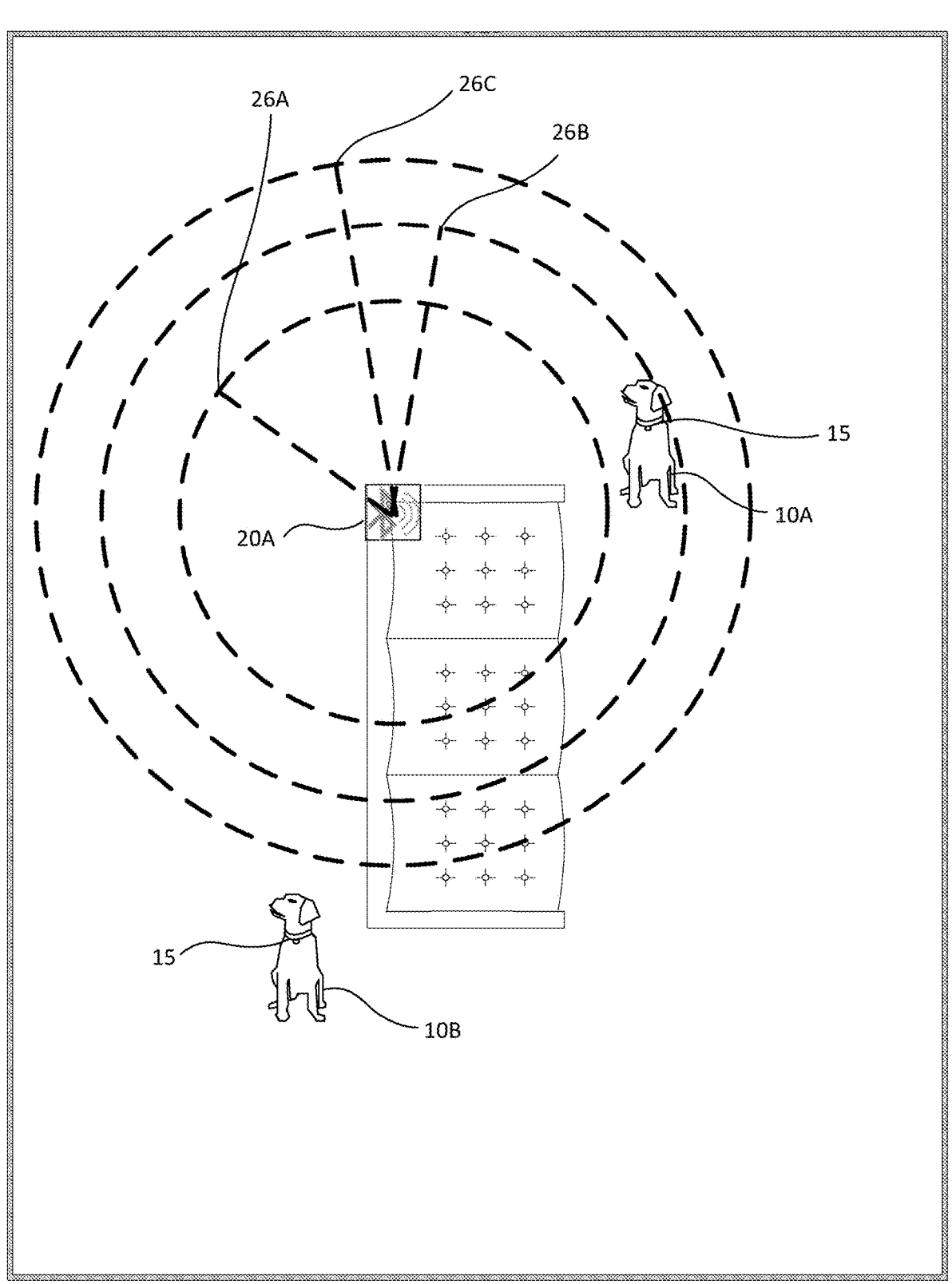
FIGS. 7A-C illustrate the deficiencies of using a single Bluetooth transmitter, and the benefits of utilizing multiple Bluetooth transmitters.
Figure 7B:
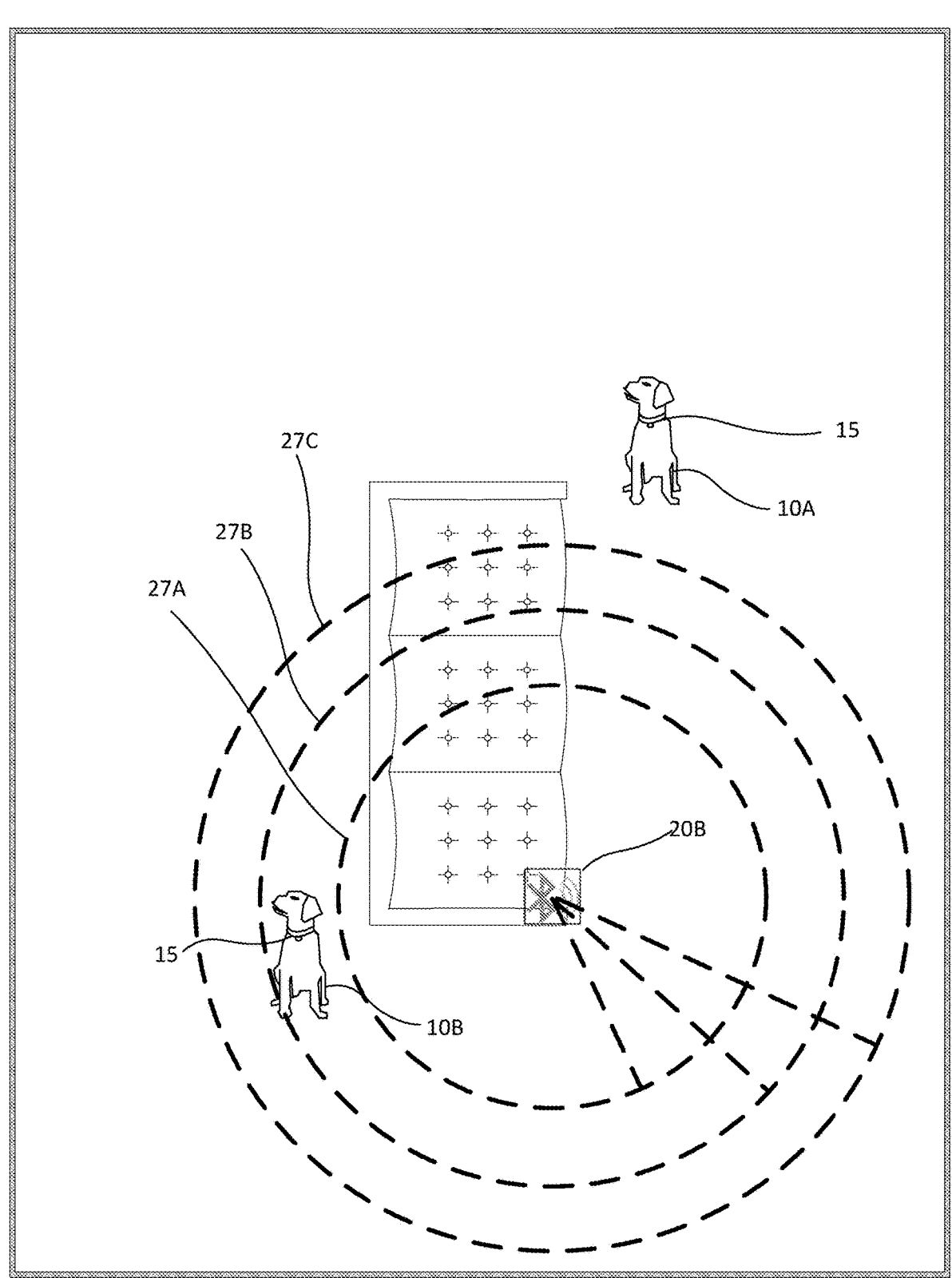
Figure 7C:
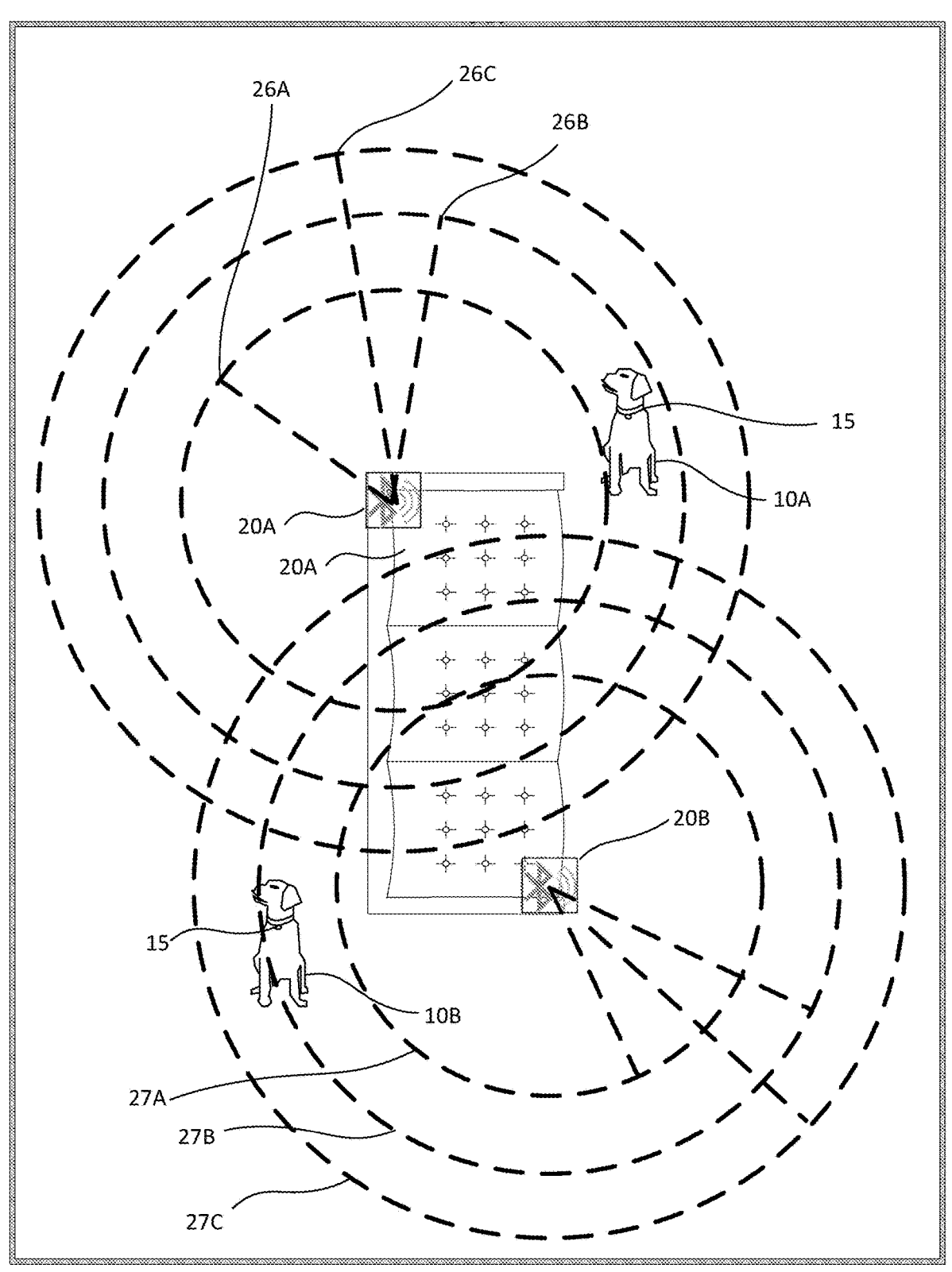

FIGS. 7A-C illustrate the deficiencies of using a single Bluetooth transmitter, and the benefits of utilizing multiple Bluetooth transmitters. For example, in FIG. 7A Bluetooth emitter 20B can emit a signal that at varying points away from the emitter decreases in intensity (or what is commonly known as signal strength). This decrease in signal strength is illustrated by concentric circles 26A, 26B, and 26C with the greater distance indicative of a weaker signal. Similarly, FIG. 7B illustrates an alternative Bluetooth Emitter 20B with associated strength signals illustrated by associated concentric circles 27A, 27B, and 27C again with the greater distance indicative of a weaker signal from 20B. In either FIG. 7A or 7B one can see that if there were only a single signal being emitted from 20A or 20B to create a prohibited zone, there could exist spots that either don't cover the anticipated or desired zone coverage, or alternatively there could be areas where the owner would like to allow animal 10A or 10B to be without triggering a correction stimulus. FIG. 7C illustrates how the overlapping of both Bluetooth emitter signals from 20A and 20B can be used to provide appropriate defined zone coverage as noted in the earlier figures and above.

Figure 8A:
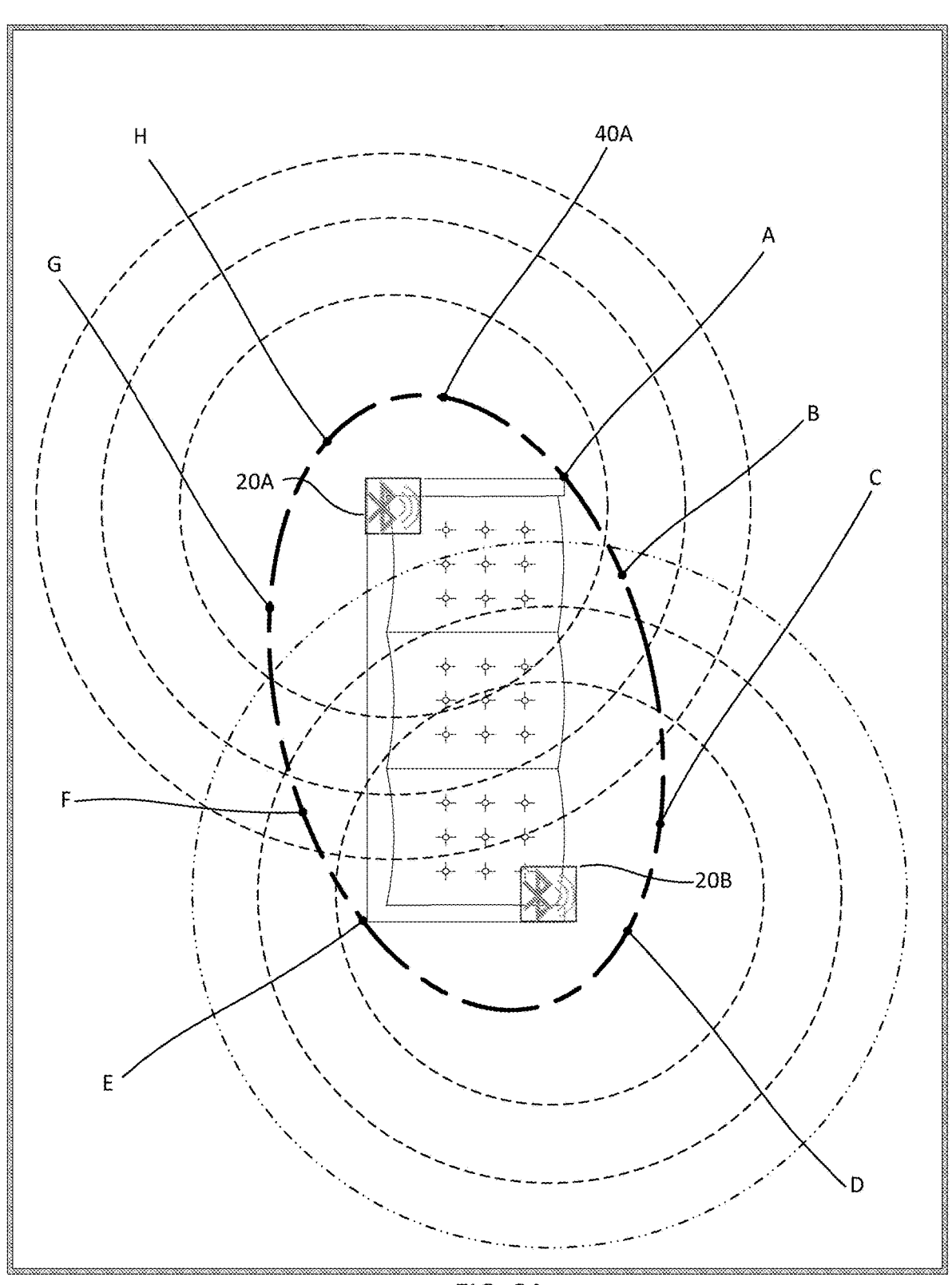

FIGS. 8A-B illustrate an example of signal strength for various points along a prohibited zone 40A from emitters 20A and 20B. Points A-H along prohibited zone 40A in FIG. 8A correspond to the table in FIG. 8B. The table in FIG. 8B is provided as an example base on an intensity scale of 1-10. As the collar or smartphone moves along the perimeter of the prohibited zone 40A the intensity from each emitter 20A and 20B changes. As noted above, this information can be analyzed and uploaded to a smart collar, so that the collar responds appropriately when determining whether or not the collar has entered the prohibited zone or not.

Figure 9A:
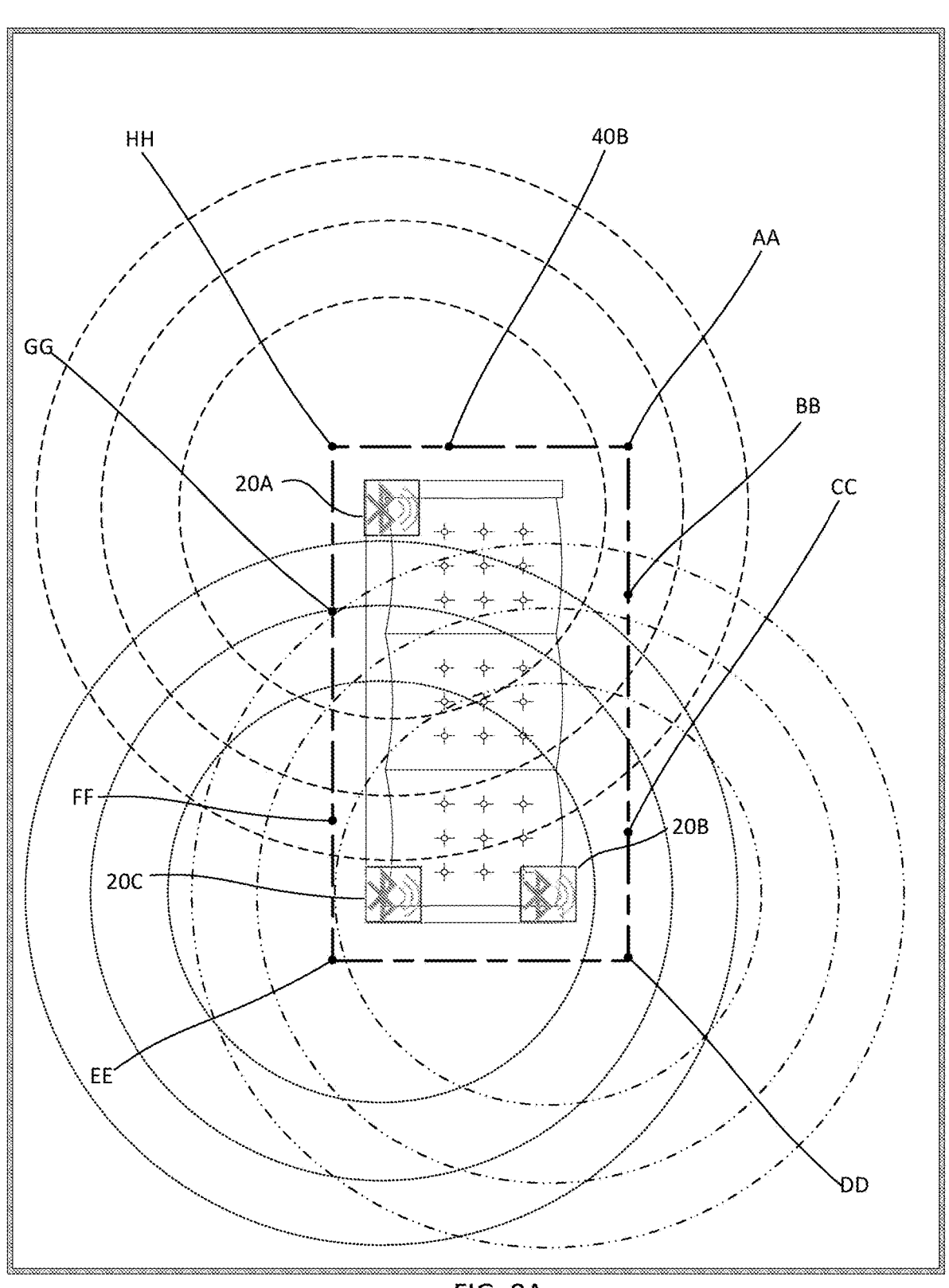

FIGS. 9A-B illustrate another example of mapping signal strength for various points into a table. As shown in FIG. 9A, three emitters 20A, 20B, and 20C are placed at various positions about a piece of furniture, where a desired prohibited zone 40B is formed around there. The prohibited zone 40B in FIG. 9A has more of rectangular shape. One of the advantages of having more than two emitters, is it is easier to form zone shapes with more distinct corner features like a rectangle. Various points AA-HH about the prohibited zone 40B have their corresponding signal strength mapped to the table shown in FIG. 9B. The table in FIG. 9B is provided as an example based on an intensity scale of 1-10. As the collar or smartphone moves along the perimeter of the prohibited zone 40B the intensity from each emitter 20A, 20B and 20C changes. Again, this information can be analyzed and uploaded to a smart collar, so that the collar responds appropriately when determining whether or not the collar has entered the prohibited zone or not. It should also be readily understood from these figures that WIFI signal strength could be a second, third or fourth emitter and tracked similarly to the Bluetooth emitters. Additional emitters help to refine the prohibited zone.

Figure 10:
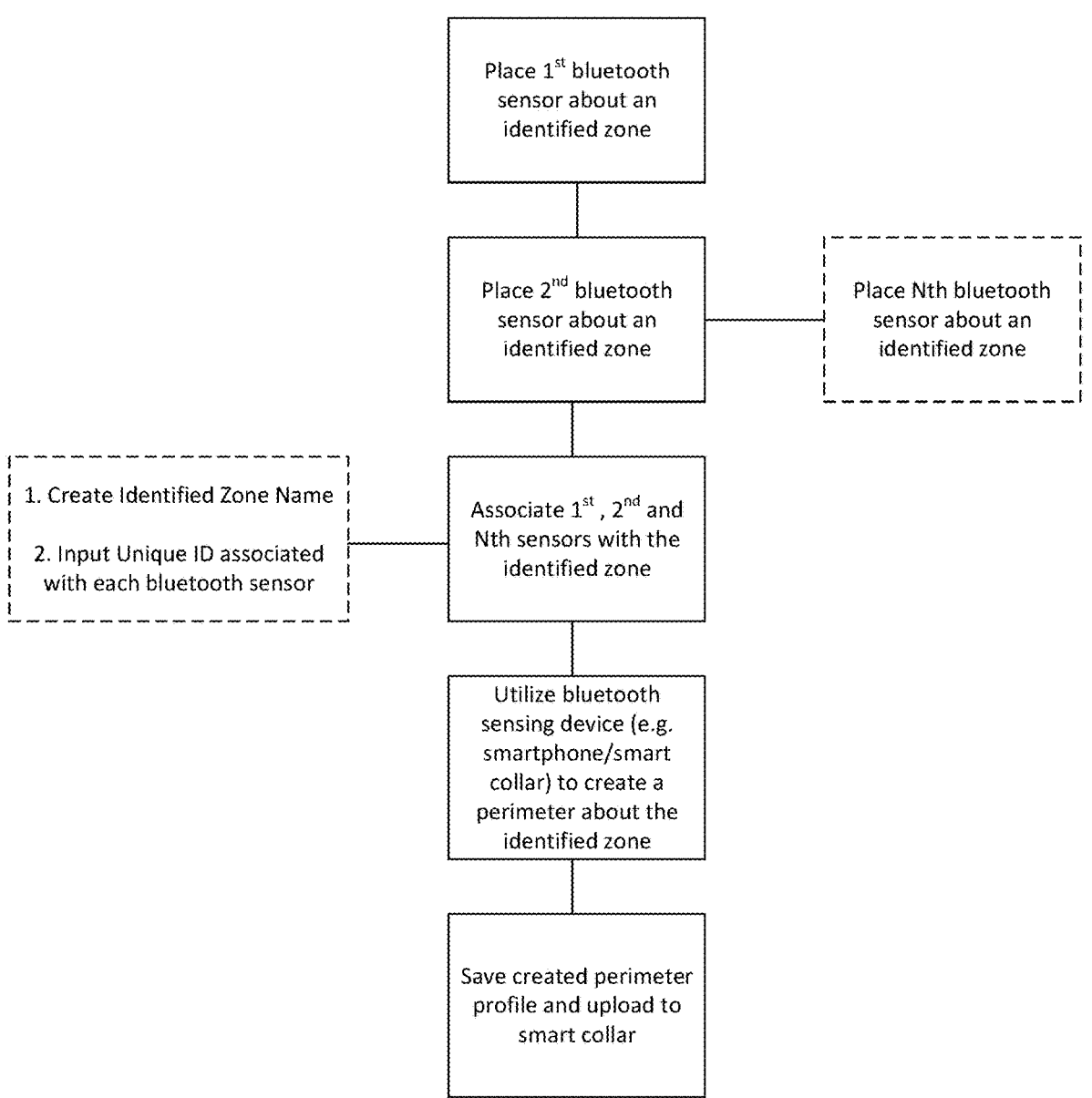
FIG. 10 is flowchart of a method of creating a prohibited zone utilizing two or more Bluetooth transmitters.

FIG. 10 is flowchart of a method of creating a prohibited zone utilizing two or more Bluetooth transmitters (and/or additional WIFI emitters). As noted in part above, a user can place a first and second (and even third or more) Bluetooth emitter about an area where they are creating a particular zone. They can then associate each of those placed emitters with a particular zone, which can be created and named. The association step can include recording the unique identification number of each Bluetooth emitter with the created zone, such that when the collar sees a signal from an emitter, it can determine the relationship with regards to that particular zone. Once the emitters are placed and associated, the user can use either a smartphone, smart collar or other Bluetooth transceiving device to create a perimeter, as discussed above. The perimeter can be saved to a profile and uploaded to the smart collar that is to be worn by the pet.

By way of example one type of smart collar can include: a control system, the control system comprising: a non-transitory computer-readable medium containing a first set of computer-implemented instructions; a first set of processing circuitry operatively connected to the non-transitory computer-readable medium, the processing circuitry being configured to implement the first set of computer instructions; a first wireless transceiver; a collar being configured to be worn by an animal, the collar further comprising: a stimulus emitter; a second wireless transceiver configured to receive signals from the control system by means of a connection with the first wireless transceiver; a second set of processing circuitry, the processing circuitry being configured to receive commands from the control system and initiate or interrupt emission of one or more stimuli from the stimulus emitter at least one stimulus being a negative stimulus; and a first Bluetooth transceiver; and a second Bluetooth transceiver, the second Bluetooth transceiver being configured to be selectively paired and connected with the first Bluetooth transceiver, the second Bluetooth transceiver being configured to emit a reduced range signal such that the first Bluetooth transceiver and the second Bluetooth transceiver only connect when within a predefined threshold distance, wherein the second Bluetooth transceiver is configured to be placed in an animal restricted area; and wherein first set of computer-implemented instructions contains instructions to perform the following tasks: determine when a connection between the first Bluetooth transceiver and the second Bluetooth transceiver has been established thus signaling entrance of the animal into the animal restricted area; send a signal to the collar instructing the collar to initiate emission of the negative stimulus from the stimulus emitter.

The smart collar can couple with or be associated with a pet training and location system which can be utilized by a pet owner to train a pet to behave in a certain manner depending on the pet's particular location as determined by a collar being worn by the pet. The dog can be trained to stay in particular permitted areas and not enter restricted areas. In some instances, the restricted and permitted areas can be statically located, such in a yard, which is a permitted zone, as opposed to outside the yard, in a garden plot, or a flower bed, which can be defined as restricted zones. Inside a house open zones and prohibited zones, such as around furniture, can also be created.

In some instances, particularly when beginning training, it can be advantageous to provide negative stimulation, or negative reinforcement to discourage a pet from leaving the permitted zone and entering one or more restricted zones. However, in some instances, once a restricted zone has already been entered it can be important to cease providing negative reinforcement, and instead provide a positive stimulus or reinforcement to encourage the pet to return to the permitted zone. Additionally, in some instances, use of negative stimulus can be omitted altogether, and positive reinforcement used as the sole mechanism for training where permitted zones and prohibited zones exist.

It will be appreciated that permitted zones can be defined using various methods, either within a connectable distance as discussed above, or alternatively the system can be provided with a user portal or web app which can present an interactive map to the user. It will also be understood that the user portal can be presented to the user or interacted with by the user via an application on a mobile device or using an online web portal. The interactive map can then be utilized by the user to draw boundary lines on the map and define interior or exterior portions of the boundaries as restricted or permitted zones or enhance or enlarge boundaries created by the above methods of utilizing the smart phone or collar and a plurality of powered transceivers.

It will be appreciated that providing negative stimulus, such as through an electrode, and associated electric shock has been utilized in many previously known systems and is known as a relatively effective training method. However, one aspect of the present invention involves providing not only a negative stimulus for a negative behavior, but also allows for providing a positive stimulus for corrective behavior or desired behavior. In particular, one aspect of the present invention involves providing a positive stimulus when a pet moves from a restricted zone to a permitted zone, or does something else that the user deems as a positive behavior. In order to provide positive stimulus, the system as contemplated can also include an audio transmitter, such as a speaker, which can be configured to provide an audio stimulus in the audible range or at ultrasonic frequencies which can be heard by the pet, but not the owner/user. In such cases, the audio transmitter can be configured to provide an audio signal which can be either pleasing or unpleasant to the pet in response to determined behaviors. The audio transmitter can provide positively trained sounds or recordings when positive activities are determined. For example, the user could record an audio recording of their voice offering praise to the pet, then the audio recording can be played to the pet when the pet comes back into the permitted zone from a restricted zone. Thus, secondary sensor can be utilized to generate the positive reinforcement mechanisms associated with system and collar. Whereas sensor is utilized to trigger or generate the negative reinforcement mechanisms associated with system and collar.

It will be understood that the audible signal can be configured to be any number of sounds, any of which can be trained to be a positive reinforcement sound for the pet. For example, with professional dog trainers the trainer can use a clicker which makes a particular noise, and give the dog a treat whenever they produce the sound with the clicker. Similar methods can be used in the present invention, and virtually any given sound with a predetermined or trained response from the pet can be utilized for this positive reinforcement. In some embodiments, such sounds can include chimes, or an ultrasonic version of any of the other sounds discussed above.

Further, it will also be understood that the audio transmitter can also be used for negative reinforcement, rather than using electric shock. In such cases the user can record a verbal reprimand, or some other negative reinforcement noise so as to provide a more humane negative reinforcement over the electric shock and electrode methodology. It will be appreciated that the speaker can be utilized by the user/owner to provide positive verbal commands, reinforcement or feedback. Each of these functions can be automatically activated or alternatively manually activated via the mobile smart device of the owner/user using the control application.

It will also be understood that a power source, such as a battery, can be provided within collar which is configured to provide power to each of the aforementioned accessories, sensors, etc. The power source can be configured to be rechargeable either through a power port, or can incorporate wireless charging technology.

As discussed in some detail above, the system will include a user platform, such as an application, which can be configured to receive input from a user. It will be understood that the application/user platform can be accessed through mobile devices, web portals, or any number of suitable means. It will be understood that the platform is operable to define at least one permitted zone where the pet is permitted to reside and at least one restricted zone where the pet is restricted from entering. This can be achieved by defining or drawing boundaries as noted above.

Additionally, it will be understood that the collar can be provided with a local processing unit and non-transitory computer-readable media for tracking location or activities and saving data with regard to those activities locally. Such a local processor and non-transitory computer-readable media can store computer instructions wherein sounds, warnings, positive reinforcement, or negative reinforcement steps and when applied can each be determined locally and performed locally after transfer of such instructions from the user platform. Accordingly, the user platform can be connected to a remote server having a remote processor and non-transitory computer-readable media can be utilized remotely, and instructions can then be transmitted to the collar to perform any such step or action using a mobile or home network.

In some embodiments, as desired by the user, the positive reinforcement signal or audible signal can sound intermittently for the entire time that the dog remains within the specified range from the user to aid in training purposes. In this manner, when the pet is behaving well, and staying within the prescribed distance, the pet will get continuous positive reinforcement. Alternatively, the system can be configured to only offer the positive reinforcement when re-entering the prescribed threshold distance from an out-of-range situation.

The system can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service for data tracking of various pet activities, parameters, etc.

In yet additional embodiments the sensors in the pet collar can be utilized to interact with detectable secondary items, said secondary items can have active or passive sensors embedded within the secondary items. In yet additional embodiments the pet collar can have active transmitters, communication devices, or sensors which are capable of interacting with alternative receivers, transmitters, communication devices, or sensors provided in alternative items separate from the control application provided on a computer or smart device configured to control the collar.

In certain embodiments, the control application can be utilized to customize a collar response by registering each of the individual independent proximity sensors and saving a profile therefore which prompts specific stimuli based on the proximity thereto. For example, a sensor on a cat and a sensor on a dog can prompt a negative response to discourage the dog from chasing the cat.

In yet additional embodiments certain collar responses can be customized by a user using the control application, such as a custom recording including particular and customized praise(s)/reprimand(s) to be played back by the speaker based on a sensed proximity to a particular item or boundary.

Figure 11A:
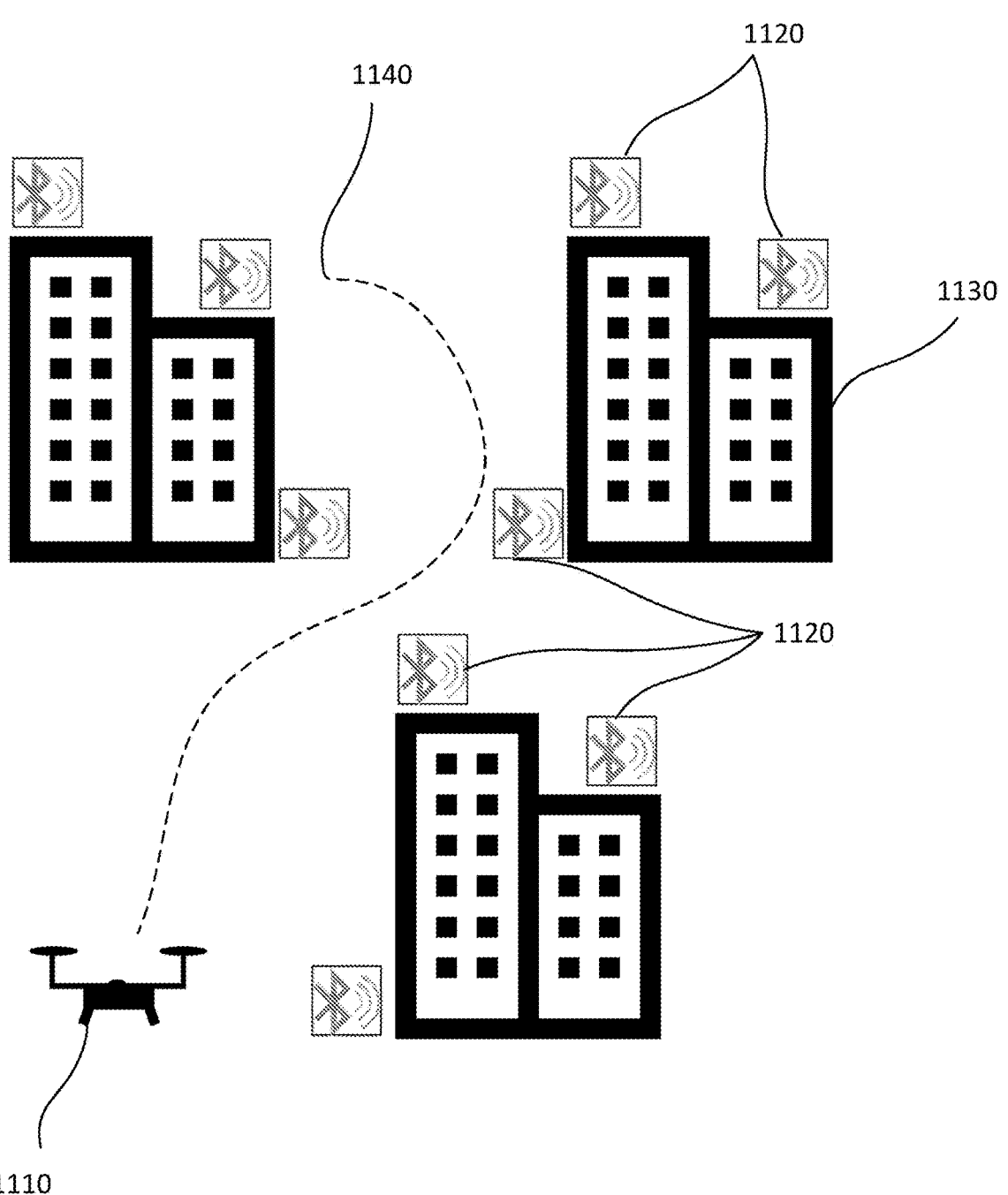
FIGS. 11A-B illustrate a schematic of a drone guidance and assistance system and method.

FIG. 11A illustrates a schematic of a drone 1100 guidance and assistance system and method, wherein a drone 1110 is navigating a path 1140 through a plurality of structures 1130, with at least some of the structures having a plurality of Bluetooth transmitters 1120. In some embodiments, the Bluetooth transmitters can also be transceivers and configured to receive information emitted from the drone 1110.

Figure 11B:
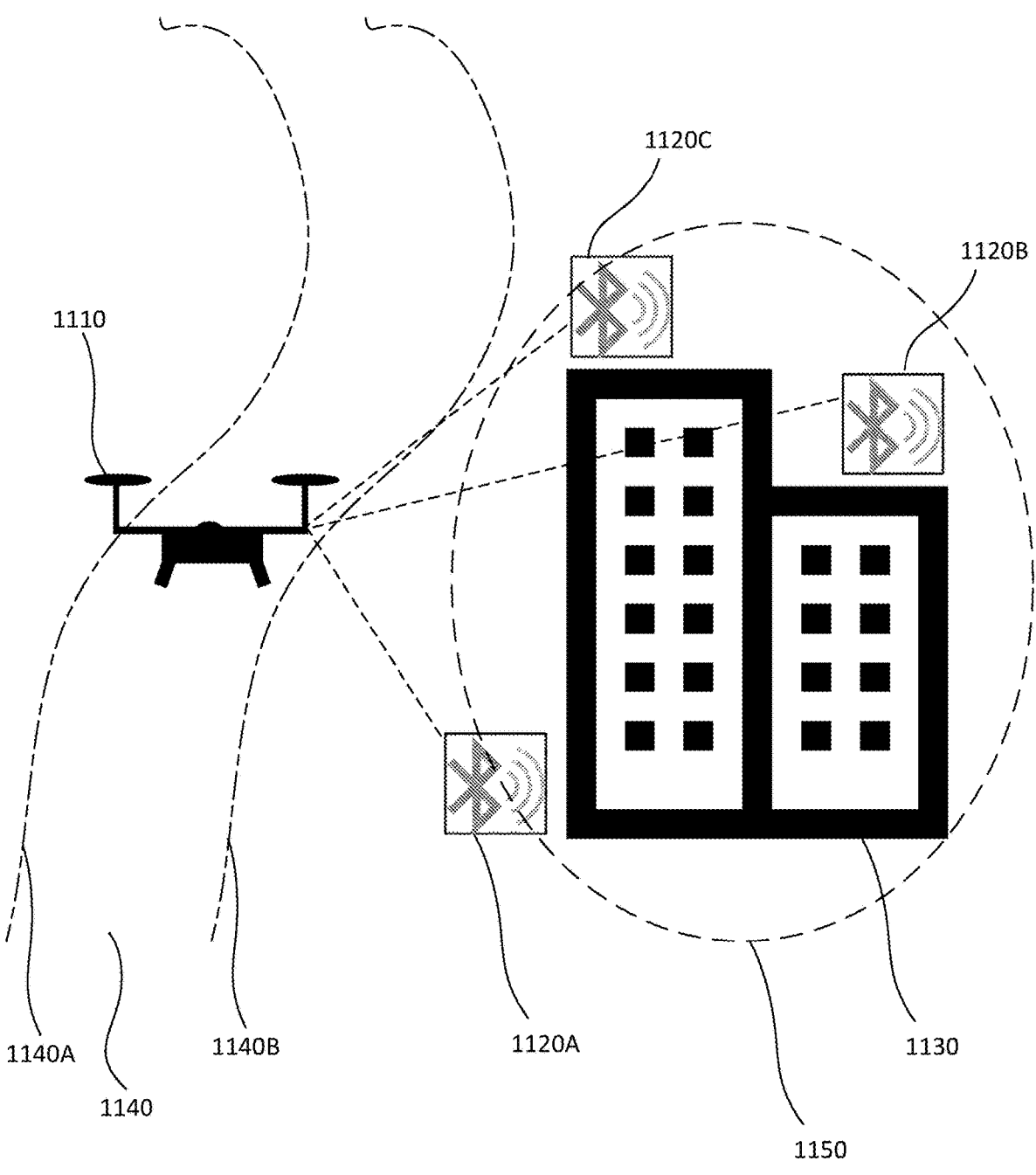

In FIG. 11B the Bluetooth transmitters 1120A-C can be used to generate a prohibited zone 1150. Similar to the tables shown in FIGS. 8B and 9B, the Bluetooth transmitters 1120A-C can each generate and emit a signal having a particular signal strength, which signal strength can be used in a table to determine whether the drone is inside or outside of the prohibited zone. The drone can have as part of its downloaded flight plan one or more tables indicative of prohibited or restricted zones. Alternatively, each Bluetooth transmitter that is associated with a particular set of Bluetooth transmitters that form a prohibited zone can transmit as part of the signal it generates the table information for that set of transmitters. Each set of transmitters can also be associated with a particular structure.

The transmitters 1120 in addition to generating a prohibited zone, can also help provide boundaries for flight path 1140. This can be accomplished by using the signal strength of the transmitters to define in part at least one edge of a boundary 1140A or 1140B of the flight path 1140. This can also be in the form a table that is pre-downloaded onto the drone as part of the pre-flight path information. It should be noted that the Bluetooth transmitters 1120 will have a limited range, so the portion of the flight path 1140 may only be for a limited section. One of the benefits, if not already apparent, is that the drone can continuously update and confirm it is within the intended flight path 1140 as it interfaces with the plurality of transmitters 1120. This is helpful for areas where the availability or accuracy of GPS coordinates might be insufficient to confirm if the drone is on a particular flight path. For example, several cites with tall structures could impede the GPS signal. In particular, as the drone is gets closer to the intended delivery site it may need to drop down into an area with lots of structures. The drone might be able to navigate above the structures, but often those heights are restricted by FAA airspace requirements, so flying above structures is not always an option.

As shown, at least three Bluetooth transmitters 1120 can be placed about each structure to create a particular prohibited zone. This enables a 3-Dimensional prohibited zone to be created, which is more relevant to appropriately guiding drones.

In yet another variation of providing guidance information to drones, each of the transmitters 1120 can emit indicator information as part of the signal each generates. This indicator information could include: structure type indicators, position relationship indicators, street indicators, transmitter set indicators, height indicators and so forth. The height indicators could simply be the particular transmitter is the highest located transmitter on a particular structure, whereas other transmitters on the structure can have a middle or lower height indicator. The height indicators can even include actual height, which again upon connecting to two or three transmitters can help the drone to determine height and compare with its other height sensor information.

Figure 12:
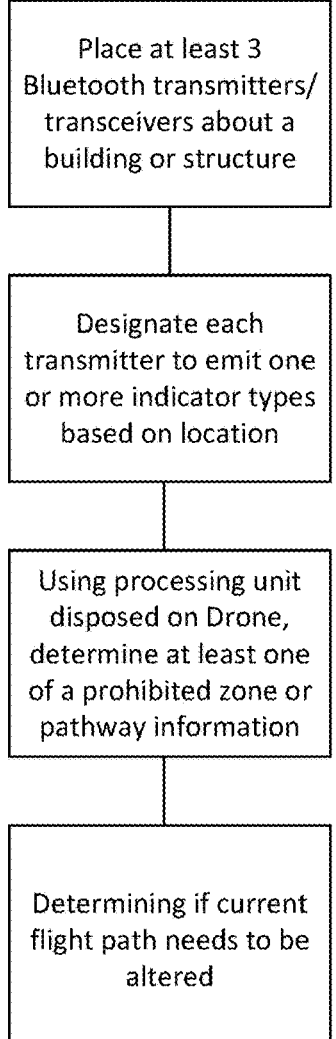
FIG. 12 illustrates a flowchart of steps associated with an embodiment of a drone guidance method.

As mentioned, already each of the indicator types and their information can be processed on the drone to help confirm whether the drone is on the intended path and update its flight pattern accordingly. A flowchart of this method is shown in FIG. 12, which walks through the steps of placing at three transmitters about a structure, designate each emitter to emit one or more indicator types, using the processor on the drone to determine based on the received signal and indicator type information if the drone is within its intended flight path or near a prohibited zone.

The information can also be used to indicate to the drone that it should be looking for similar types of transmitters associated with a particular set of transmitters. For example, if the drone is coming near Building A and initially sees a transmitter associated with Building A, it can begin looking for other types of transmitters associated with Building A. If the first transmitter it comes upon is sending position relationship information, such as the GPS coordinates of Building A, the drone can confirm with its current position to determine if it is within the intended flight path. Additionally, one of the transmitters could be placed on a side of the Building A that only transmits street indicator information for the particular street that side of the building faces, thus by using the GPS of the building, and the street indicator that side of the building is facing the drone can more accurately determine if it is on its intended flight path and correct if necessary.

The structure indicator information can also be used as a guidepost to determine the next intended structure or Building the drone may be encountering on its flight path. For example, the flight path may have the drone passing by Building A, then B, then C. If the drone knows its current speed or most recent speed, it can anticipate to see emitters associated with Building B and then C within a certain amount of time as it travels along its intended path.

Figure 13:
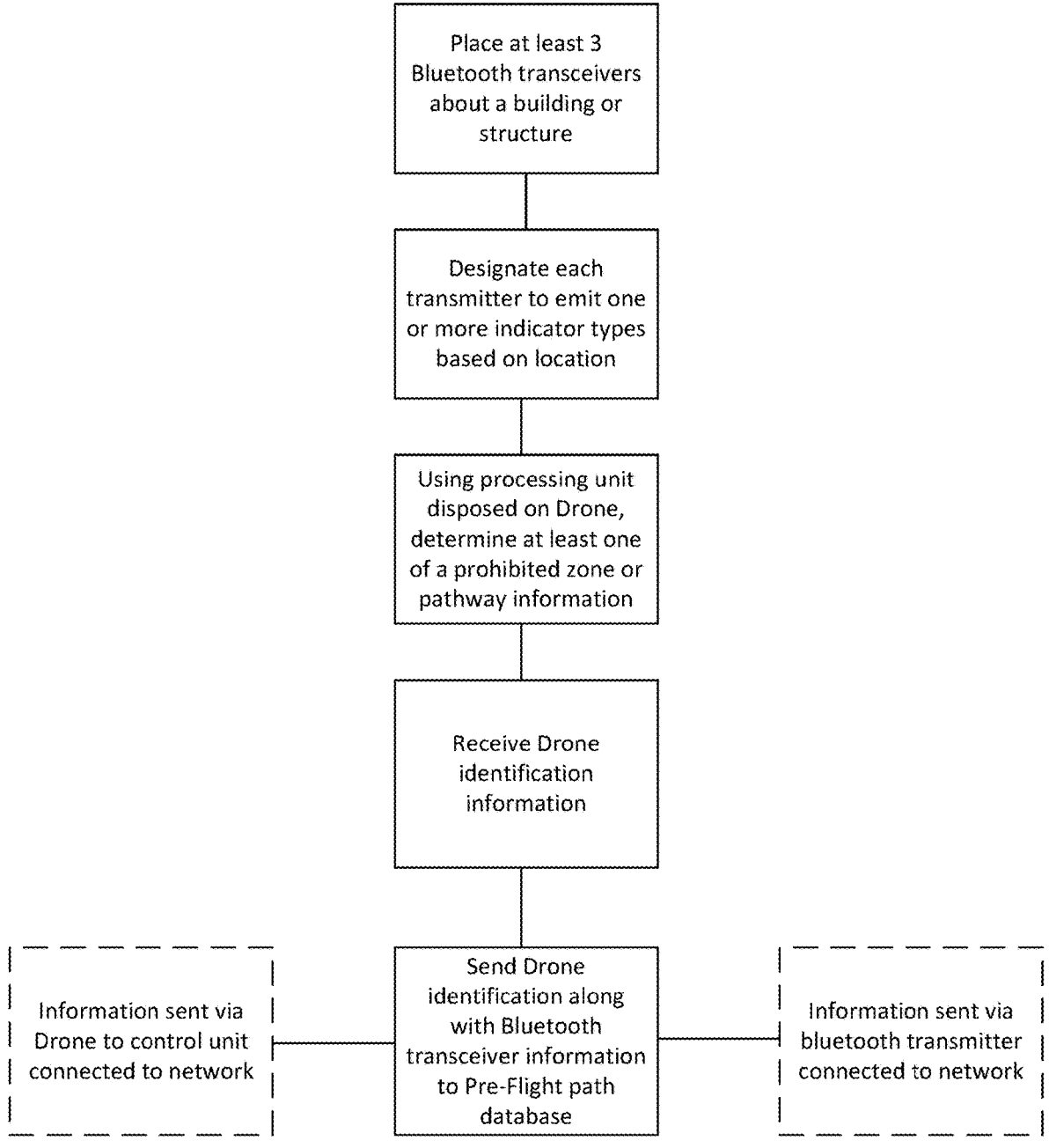
FIG. 13 illustrates a flowchart of steps associated with another embodiment of a drone guidance method.
Figure 14:
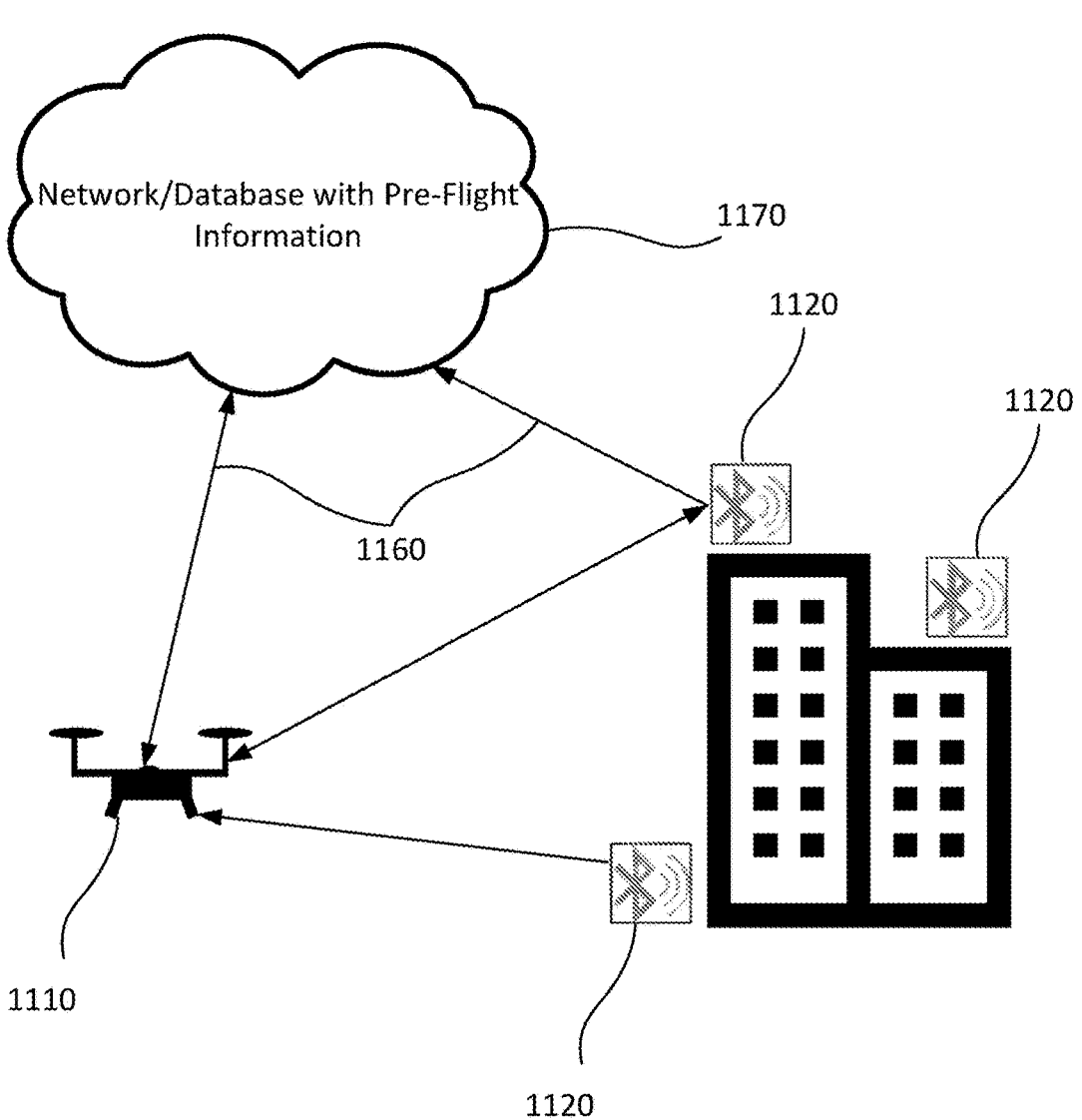
FIG. 14 illustrates a schematic of a drone guidance and assistance system utilizing a networked database with pre-flight information.

In some variations, the drone can transmit and the transmitters 1120 can receive drone identification information. For example, the flowchart in FIG. 13 illustrates a method of having the transmitters 1120 receive drone identification information, which can then be used to send along with the transmitter indicator information via a network to a database having the pre-flight information stored therein. At this point the system could compare the received information with the original pre-flight path information to confirm the drone is on its intended path. This information could be relayed to a user or intended recipient in the form of an update. If the drone is off its intended path or intended time that information can also be relayed. Along with the drone identification information, the drone can also send or include battery level information and other status or sensed information. The database containing the pre-flight plans can receive this information via the drone itself connecting to a network or alternatively via the transmitters connected to the network. If upon receiving this information or other information that may cause the drone's intended path to be updated the system can relay the updated information back to the drone directly to a connected network or via the transmitters. FIG. 14 illustrates a schematic 1400 where drone 1110 and or transmitters 1120 communicate via network 1160 to the pre-flight database 1170, which can also be connected with cloud or server processing units to compare and update information as needed. Network 1160 can be a closed or open network, such as the world wide web. Communicating means with network 1160 include at least WiFi, cellular, ethernet and Lan connectivity types.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A collar comprising:
   a strap configured to be worn by an animal;
   one or more processors; and
   a memory storing instructions, the instructions, when executed by the one or more processors, being configured to cause the collar to:
   receive a first signal from a first wireless transmitter;
   receive a second signal from a second wireless transmitter;
   based at least in part on the first signal and the second signal, determine whether the collar is located in a prohibited zone, wherein the prohibited zone is defined by distance metrics recorded to the memory while the collar is moved along a border of the prohibited zone; and in response to determining that the collar is located in the prohibited zone, output one or more corrective actions.

2. The collar of claim 1, wherein determining whether the collar is located in the prohibited zone comprises:

estimating a first distance metric measured between the collar and the first wireless transmitter;

estimating a second distance metric measured between the collar and the second wireless transmitter.

3. The collar of claim 1, wherein the instructions, when executed by the one or more processors, are further configured to cause the collar to:

determine whether the collar has exited the prohibited zone; and in response to determining that the collar has exited the prohibited zone, output one or more positive feedback actions.

4. The collar of claim 1, wherein the prohibited zone comprises a non-circular shape.

5. The collar of claim 4, wherein the prohibited zone comprises a rectangular shape.

6. The collar of claim 1, wherein the first signal and the second signal comprise two different types of wireless signals.

7. The collar of claim 6, wherein the first signal comprises a Bluetooth signal and the second signal comprises a Wi-Fi signal.

8. The collar of claim 1, wherein the instructions, when executed by the one or more processors, further cause the collar to output a message to one or more connected devices.

9. A collar comprising:

a strap configured to be worn by an animal;

one or more processors; and a memory storing instructions, the instructions, when executed by the one or more processors, being configured to cause the collar to:

receive a first wireless signal from a first wireless transmitter;

receive a second wireless signal from a second wireless transmitter; and while the collar is moved along a border of a prohibited zone:

determine a plurality of first distance metrics between the collar and the first wireless transmitter, the plurality of first distance metrics corresponding to a plurality of locations;

determine a plurality of second distance metrics between the collar and the wireless transmitter, the plurality of second distance metrics corresponding to the plurality of locations; and record the plurality of first distance metrics and the plurality of second distance metrics to the memory, the plurality of first distance metrics and the plurality of second distance metrics defining the prohibited zone.

10. The collar of claim 9, wherein the prohibited zone comprises a non-circular shape.

11. The collar of claim 10, wherein the prohibited zone comprises a rectangular shape.

12. The collar of claim 10, wherein the prohibited zone comprises a three-dimensional shape.

13. The collar of claim 9, wherein the first signal and the second signal comprise two different types of signals.

14. The collar of claim 13, wherein the first signal comprises a Bluetooth signal and the second signal comprises a Wi-Fi signal.

15. The collar of claim 9, wherein the instructions, when executed by the one or more processors, are further configured to cause the collar to:

determine whether the collar is located in the prohibited zone; and in response to determining that the collar is located in the prohibited zone, output one or more corrective actions.

16. The collar of claim 14, wherein the instructions, when executed by the one or more processors, are further configured to cause the collar to:

determine whether the collar has exited the prohibited zone; and in response to determining that the collar has exited the prohibited zone, output one or more positive feedback actions.

17. The collar of claim 14, wherein the instructions, when executed by the one or more processors, further causes the collar to output a message to one or more connected devices.

18. A collar comprising:

receiving, at a wireless device, a first wireless signal from a first wireless transmitter;

receiving, at the wireless device, a second wireless signal from a second wireless transmitter;

moving the wireless device along a border of a prohibited zone, the prohibited zone comprising an area where an animal is discouraged from entering;

while moving the wireless device along the border of the prohibited zone:

determining a plurality of first distance metrics between the wireless device and the first wireless transmitter corresponding to a plurality of locations;

determining a plurality of second distance metrics between the wireless device and the wireless transmitter corresponding to the plurality of locations; and recording the plurality of first distance metrics and the plurality of second distance metrics to a memory, the plurality of first distance metrics and the plurality of second distance metrics defining the prohibited zone.

19. The method of claim 18, wherein the wireless device comprises a mobile phone.

20. The method of claim 18, wherein the wireless device comprises a smart collar.

* * * * *